US008077563B2

(12) United States Patent
Tanaka et al.

(10) Patent No.: US 8,077,563 B2

(45) Date of Patent: Dec. 13, 2011

(54) BEAM APPLYING METHOD, OPTICAL RECORDING MEDIUM, AND RECORDING AND REPRODUCING APPARATUS

(75) Inventors: Kenji Tanaka, Tokyo (JP); Atsushi Fukumoto, Kanagawa (JP)

(73) Assignee: Sony Corporation, Tokyo (JP)

(*) Notice: Subject to any disclaimer, the term of this patent is extended or adjusted under 35 U.S.C. 154(b) by 631 days.

(21) Appl. No.: 12/107,588

(22) Filed: Apr. 22, 2008

(65) Prior Publication Data

US 2008/0285395 A1 Nov. 20, 2008

(30) Foreign Application Priority Data

May 15, 2007 (JP) ................................ 2007-129194

(51) Int. Cl.
*G11B 7/00* (2006.01)

(52) U.S. Cl. ........... 369/44.23; 369/112.16; 369/112.15; 369/112.17; 369/112.18; 369/112.19; 369/112.1; 369/112.02; 369/103

(58) Field of Classification Search ........................ None
See application file for complete search history.

(56) References Cited

U.S. PATENT DOCUMENTS

| | | | | |
|---|---|---|---|---|
| 5,301,182 | A * | 4/1994 | Komma et al. | 369/112.12 |
| 7,170,661 | B2 * | 1/2007 | Ogasawara et al. | 359/22 |
| 2004/0165518 | A1 * | 8/2004 | Horimai et al. | 369/94 |
| 2007/0047037 | A1 * | 3/2007 | Yoshizawa et al. | 359/3 |
| 2008/0285395 | A1 * | 11/2008 | Tanaka et al. | 369/44.23 |
| 2009/0059763 | A1 * | 3/2009 | Kamada et al. | 369/103 |
| 2009/0290471 | A1 * | 11/2009 | Tanaka et al. | 369/103 |
| 2009/0323496 | A1 * | 12/2009 | Tanaka et al. | 369/100 |

FOREIGN PATENT DOCUMENTS

| | | |
|---|---|---|
| JP | 2003-039001 | 2/2003 |
| JP | 2004-265472 | 9/2004 |
| JP | 2005-292766 | 10/2005 |
| JP | 2006-163021 | 6/2006 |
| JP | 2007-102185 | 4/2007 |
| WO | 2005-109117 | 11/2005 |

OTHER PUBLICATIONS

Toishi et al., "Experimental analysis in recording transmission and reflection holograms at the same time and location," Applied Optics, vol. 45, pp. 6367-6373, 2006.

Japanese Office Action dated Apr. 14, 2009, for corresponding JP Patent Application 2007-129194.

Japanese Office Action dated Sep. 28, 2010, for corresponding JP Patent Application 2009-137239.

* cited by examiner

*Primary Examiner* — Joseph Haley
*Assistant Examiner* — Ifedayo Iluyomade
(74) *Attorney, Agent, or Firm* — K&L Gates LLP

(57) ABSTRACT

In a beam applying method, recording and reproducing operations are performed on an optical recording medium, in which a signal is recorded and reproduced by applying a beam thereto and which has a recording layer on which the signal is recorded, a quarter-wavelength plate formed below the recording layer, a polarizing plate formed further below the quarter-wavelength plate, and a reflecting film formed below the quarter-wavelength plate. The beam applying method includes the steps of; emitting a beam to be applied to the optical recording medium; and driving a quarter-wavelength plate inserted into an optical system serving to guide the emitted beam to the optical recording medium so that the optical axis direction thereof has a predetermined angle difference at the time of performing a recording operation and reproduction.

2 Claims, 27 Drawing Sheets

AT THE TIME OF PERFORMING A RECORDING OPERATION

X-LINEAR POLARIZED BEAM

CIRCULARLY-POLARIZED BEAM (ROTATED TO RIGHT)

FIRST TECHNIQUE

X-LINEAR POLARIZED BEAM

LD
1
2
3
4
5
6
7
8
9
10
11

BEAM MODULATED BY SLM AT THE TIME OF PERFORMING A RECORDING OPERATION
INCIDENT BEAM
3
REFERENCE BEAM
SIGNAL BEAM
BEAM MODULATED BY SLM
9
10
CONCENTRATE REFERENCE BEAM AND SIGNAL BEAM IN THE SAME AXIS AND RECORD DATA ON MEDIUM

AT THE TIME OF PERFORMING
A RECORDING OPERATION
4
12
9
50
51
52
49
53
HM1
FIRST TECHNIQUE
X-LINEAR
POLARIZED BEAM
CIRCULARLY-POLARIZED BEAM
(ROTATED TO RIGHT)
45°
x
y

AT THE TIME OF PERFORMING
A REPRODUCING OPERATION
TO IMAGE
SENSOR
4
12
9
50
51
52
49
53
HM1
FIRST TECHNIQUE
X-LINEAR
POLARIZED BEAM
CIRCULARLY-POLARIZED BEAM
(ROTATED TO RIGHT)
Y-LINEAR
POLARIZED BEAM
45°
x
y

LD (FIRST LASER)
1
2
3
4
5
6
7
9
11
12
13
14
15
16
17
18
19
20
21
22
23
24
25
HM1
LD (SECOND LASER)
REPRODUCING DATA
RECORDING DATA
DATA REPRODUCING UNIT
DATA MODULATION AND AMPLITUDE CONTROL UNIT
REFLECTED BEAM SIGNAL GENERATING CIRCUIT
WAVELENGTH-PLATE ROTATION CONTROL UNIT
ACCESS CONTROL AND SLIDE DRIVE UNIT
SLIDE MECHANISM

AT THE TIME OF PERFORMING
A RECORDING OPERATION
4
30
9
50
51
57
53
HM2
SECOND TECHNIQUE
X-LINEAR
POLARIZED BEAM
X-LINEAR
POLARIZED BEAM
※ ABSORPTION OF X POLARIZED BEAM
TRANSMISSION OF Y POLARIZED BEAM
x
y

AT THE TIME OF PERFORMING A REPRODUCING OPERATION
TO IMAGE SENSOR
4
30
9
50
51
57
53
HM2
45°
X-LINEAR POLARIZED BEAM
Y-LINEAR POLARIZED BEAM
SECOND TECHNIQUE 50
51
57
53
HM2
54
55
56

AT THE TIME OF PERFORMING
A RECORDING OPERATION
4
30
9
50
51
58
HM3
THIRD TECHNIQUE
X-LINEAR
POLARIZED BEAM
Y-LINEAR
POLARIZED BEAM
x
y
※ TRANSMISSION OF X POLARIZED BEAM
REFLECTION OF Y POLARIZED BEAM

AT THE TIME OF PERFORMING
A REPRODUCING OPERATION
TO IMAGE
SENSOR
4
30
9
50
51
58
HM3
THIRD TECHNIQUE
45°
x
y
X-LINEAR
POLARIZED BEAM
Y-LINEAR
POLARIZED BEAM
※ TRANSMISSION OF X POLARIZED BEAM
REFLECTION OF Y POLARIZED BEAM 50
51
58
HM3
56
54
59

LD (FIRST LASER)
RECORDING DATA
REPRODUCING DATA
DATA REPRODUCING UNIT
DATA MODULATION AND AMPLITUDE CONTROL UNIT
LD (SECOND LASER)
HM2
REFLECTED BEAM SIGNAL GENERATING CIRCUIT
ROTATION ANGLE INFORMATION DETECTING UNIT
WAVELENGTH-PLATE ROTATION CONTROL UNIT
SPM
SPINDLE SERVO DRIVE CIRCUIT
1
2
3
4
5
6
7
9
11
13
14
15
16
17
18
19
20
21
23
30
31
32
33
34

AT THE TIME OF PERFORMING A REPRODUCING OPERATION
4
30
9
50
51
58
TO IMAGE SENSOR
HM3
ROTATION BY φ°
MODIFIED EXAMPLE OF THIRD TECHNIQUE
y
x
X-LINEAR POLARIZED BEAM
y
x
φ + 90°
LINEARLY-POLARIZED BEAM
y
x
φ

AT THE TIME OF PERFORMING
A REPRODUCING OPERATION
4
TO IMAGE
SENSOR
12
9
50
51
61
HM5
FIFTH TECHNIQUE
y
x
Y STRAIGHT LINE
POLARIZATION
y
x
X-LINEAR
POLARIZED BEAM
y
x
y
x
CIRCULARLY-
POLARIZED BEAM
(ROTATED TO LEFT)

PATTERN A: SIGNAL BEAM (FORWARD PATH) x REFERENCE BEAM (FORWARD PATH)

PATTERN B: SIGNAL BEAM (FORWARD PATH) x REFERENCE BEAM (BACKWARD PATH)

PATTERN C: SIGNAL BEAM (BACKWARD PATH) x REFERENCE BEAM (FORWARD PATH)

PATTERN D: SIGNAL BEAM (BACKWARD PATH) x REFERENCE BEAM (BACKWARD PATH)

BEAM APPLYING METHOD, OPTICAL RECORDING MEDIUM, AND RECORDING AND REPRODUCING APPARATUS

CROSS REFERENCES TO RELATED APPLICATIONS

The present application claims priority to Japanese Patent Application JP 2007-129194 filed in the Japanese Patent Office on May 15, 2007, the entire contents of which is incorporated herein by reference.

BACKGROUND

The present application relates to a beam applying method of performing recording and reproducing operations on an optical recording medium in which a signal is recorded and reproduced by applying a beam thereto, an optical recording medium, and a beam applying apparatus that performs recording and reproducing operations on an optical recording medium.

In a hologram recording and reproducing system in the field of optical storage, a spatial light modulator (SLM) such as a transmissive liquid crystal panel and a digital micro mirror device (DMD) is used as a light intensity modulator and the intensity of a signal beam is modulated to obtain a pattern arrangement of bit1 (for example, light intensity=high) and bit0 (for example, light intensity=low).

At this time, the SLM generates the signal beam by modulating the light intensity of a beam at the center thereof on the basis of recording data and generates a reference beam by allowing a beam to pass through the periphery thereof in a ring shape. The signal beam modulated on the basis of the recording data is applied to a hologram recording medium along with the reference beam, whereby an interference pattern of the signal beam and the reference beam is recorded as data in the hologram recording medium.

At the time of reproducing data, a diffracted beam corresponding to the interference pattern is obtained by allowing the SLM to generate only the reference beam and applying the generated reference beam to the hologram recording medium. An image corresponding to the diffracted beam is formed on an image sensor such as a CCD (Charge Coupled Device) sensor and a CMOS (Complementary Metal-Oxide Semiconductor) sensor and values of the recorded bits are obtained, thereby reproducing the data.

Accordingly, the hologram recording and reproducing system in which a signal beam and a reference beam are applied in the same optical axis is known as a coaxial system.

Here, in the hologram recording and reproducing system, when a reflecting hologram recording medium (a hologram recording medium having a reflecting film) is used as the hologram recording medium, optical technologies of an optical disk such as a CD (Compact Disc) or a DVD (Digital Versatile Disc) can be sufficiently used, but a hologram formed by applying a signal beam and a reference beam is complicated.

FIGS. 25A, 25B, 26A, and 26B show patterns of holograms which can be formed at the time of recording data on a reflecting hologram recording medium.

As shown in FIGS. 25A to 26B, total 4 patterns of holograms can be formed when data are recorded in the reflecting hologram recording medium:

Pattern A; signal beam (forward path)×reference beam (forward path)=transmissive hologram Pattern B; signal beam (forward path)×reference beam (backward path)=reflective hologram Pattern C; signal beam (backward path)×reference beam (forward path)=reflective hologram Pattern D; signal beam (backward path)×reference beam (backward path)=transmissive hologram Specifically, the transmissive hologram of pattern A shown in FIG. 25A is a hologram formed by means of interference of both forward beams of a signal beam and a reference beam applied to the hologram recording medium through an objective lens as shown in the figure. The reflective hologram of pattern B shown in FIG. 25B is a hologram formed by means of interference of a forward beam of a signal beam applied to the hologram recording medium through the objective lens and a backward beam of a reference beam reflected from the hologram recording medium.

The reflective hologram of pattern C shown in FIG. 26A is a pattern opposite to pattern B, that is, a hologram formed by means of interference of a forward beam of the reference beam applied to the hologram recording medium through the objective lens and a backward beam of the signal beam reflected from the hologram recording medium. The transmissive hologram of pattern D shown in FIG. 26B is a hologram formed by means of interference of both backward beams of the reference beam and the signal beam reflected by the hologram recording medium.

The 4 holograms are difference from each other in characteristics of the interference pattern due to differences in traveling direction and angle and have different selectivities for medium shift and wavelength shift (for example, see M. Toishi et al. Appl. Opt., Vol. 45, No. 25, p. 6367 (2006)). Accordingly, it is not easy to correction the characteristics in the shifts, thereby causing a deterioration in SNR (S/N ratio).

A technique disclosed in U.S. Patent Application Publication No. 2003/0039001 is known to solve the above-mentioned problem.

In U.S. Patent Application Publication No. 2003/0039001, as shown in FIG. 27A, a quarter-wavelength plate is inserted as a layer in front of a reflecting film in the reflecting hologram recording medium. That is, a cover glass, a recording layer, and a reflecting film are formed sequentially from the uppermost layer in a general reflecting hologram recording medium, but the quarter-wavelength plate is inserted between the recording layer and the reflecting film in this case.

By using the above-mentioned hologram recording medium, it is possible to effectively prevent the reflective hologram from occurring. This is shown in FIG. 27B. As shown in the figure, for example, an X-linear polarized beam is applied to the hologram recording medium through the objective lens. The X-linear polarized beam applied to the hologram recording medium passes through the recording layer of the hologram recording medium, is converted into a right-rotated circularly-polarized beam as shown in the figure by passing through the quarter-wavelength plate, and then reaches the reflecting film below the quarter-wavelength plate. The circularly-polarized beam reaching the reflecting film is reflected therefrom and passes through the quarter-wavelength film again. Accordingly, the reflected beam from the hologram recording medium is obtained from the Y-linear polarized beam as shown in the figure.

According to the technique described in U.S. Patent Application Publication No. 2003/0039001, the forward beam to the hologram recording medium can be obtained by the use of the X-linear polarized beam and the backward beams as the reflected beam can be obtained by the use of the Y-linear polarized beam. That is, polarization directions of the forward beam and the backward beam are perpendicular to each other to prevent the interference of the forward beam and the backward beam, thereby effectively preventing the reflective hologram resulting from pattern B and pattern C.

SUMMARY

In the configuration described in U.S. Patent Application Publication No. 2003/0039001, the generation of the reflective hologram is prevented by making the polarization directions of the forward beam and the backward beam perpendicular to each other.

However, in the description with reference to FIGS. 25A to 26B, two kinds of transmissive holograms are formed at the time of recording data on the hologram recording mediums. In this case, even when only the generation of the reflective hologram is prevented, two kinds of transmissive holograms corresponding to pattern A shown in FIG. 25A and pattern D shown in FIG. 26B are formed and thus plural holograms are recorded on the hologram recording medium. Accordingly, the configuration described in U.S. Patent Application Publication No. 2003/0039001 does not sufficiently improve the SNR.

According to a first embodiment, there is provided a beam applying method of performing recording and reproducing operations on an optical recording medium, in which a signal is recorded and reproduced by applying a beam thereto and which has a recording layer on which the signal is recorded, a quarter-wavelength plate formed below the recording layer, a polarizing plate formed further below the quarter-wavelength plate, and a reflecting film formed below the quarter-wavelength plate. The beam applying method includes the steps of; emitting a beam to be applied to the optical recording medium; and driving a quarter-wavelength plate inserted into an optical system serving to guide the emitted beam to the optical recording medium so that the optical axis direction thereof has a predetermined angle difference at the time of performing a recording operation and reproduction.

First, in order to prevent a reflective hologram from being generated and to form only one kind of transmissive hologram, a reflected beam (that is, the backward beam) from the optical recording medium should not be generated at the time of performing a recording operation. That is, the hologram formed at the time of performing a recording operation includes only one kind of transmissive hologram resulting from the interference of only the forward beams. However, it is noted that the reflected beam from the optical recording medium should be obtained as the reproduced beam at the time of performing a reproducing operation. That is, in order to perform the recording and reproducing operations on the optical recording medium by recoding only one kind of transmissive hologram, it is necessary not to generate the backward beam at the time of performing the recording operation and to obtain the backward beam at the time of performing the reproducing operation.

As described above, when a beam is applied to an optical recording medium through the quarter-wavelength plate and the recording layer, the quarter-wavelength plate, the polarization element, and the reflecting film are formed in the optical recording medium, a circularly-polarized beam of a predetermined rotation direction should be applied to the optical recording medium at the time of performing a recording operation and a circularly-polarized beam of the opposite direction should be applied at the time of performing a reproducing operation, in order not to generate the backward beam at the time of performing a recording operation and to obtain the backward beam at the time of performing a reproducing operation. In this way, when the circularly-polarized beam is applied through the quarter-wavelength plate at the time of performing a recording operation, the circularly-polarized beam is converted into a linearly-polarized beam of a predetermined direction by the quarter-wavelength plate and the resultant beam is incident on the polarizing plate. As known well, the polarizing plate has a characteristic of absorbing a linearly-polarized beam of a predetermined direction and transmitting a linearly-polarized beam of a direction perpendicular thereto. Accordingly, by inputting the linearly-polarized beam of a predetermined direction to the polarizing plate, the input linearly-polarized beam is absorbed by the polarizing plate and thus the forward beam does not reach other reflecting film, thereby not generating the reflected beam (backward beam). On the other hand, when a circularly-polarized beam of the opposite rotation direction is applied to the optical recording medium through the quarter-wavelength plate at the time of performing a reproducing operation, the circularly-polarized beam is converted into a linearly-polarized beam of a direction perpendicular to the predetermined direction by the quarter-wavelength plate of the medium side and the resultant beam is incident on the polarizing plate. According to the above-mentioned characteristic of the polarizing plate, the linearly-polarized beam of the perpendicular direction passes through the polarizing plate and reaches the reflecting film. As a result, the backward beam can be generated at the time of performing a reproducing operation.

On this assumption, according to the beam applying method as a first technique of the present application, a beam can be applied to an optical recording medium, in which the recording layer, the quarter-wavelength plate, the polarization element, and the reflecting film are formed, through the quarter-wavelength plate providing a predetermined angle difference between the recording operation and the reproducing operation in the optical axis direction. In this way, when a beam is applied to the optical recording medium through the quarter-wavelength plate providing a predetermined angle difference between the recording operation and the reproducing operation in the optical axis direction, a circularly-polarized beam of a predetermined rotation direction can be applied to the optical recording medium at the time of performing a recording operation and a circularly-polarized beam of the opposite direction can be applied at the time of performing a reproducing operation. That is, according to the beam applying method as the first technique, it is possible not to generate a backward beam at the time of performing a recording operation and to obtain the backward beam at the time of performing a reproducing operation.

According to a second embodiment, there is provided a beam applying method of performing recording and reproducing operations on an optical recording medium, in which a signal is recorded and reproduced by applying a beam thereto and which has a recording layer on which the signal is recorded, an absorbing polarization element formed below the recording layer, and a reflecting film formed below the absorbing polarization element. The beam applying method includes the steps of; emitting a beam to be applied to the optical recording medium; and driving a wavelength plate inserted into an optical system serving to guide the emitted beam to the optical recording medium so that the optical axis direction thereof has a predetermined angle difference at the time of performing a recording operation and reproduction.

The absorbing polarization element means an absorbing linear polarization element having a characteristic of absorbing a linearly-polarized beam of a polarization direction parallel to the polarization axis direction thereof and transmitting a linearly-polarized beam of a polarization direction perpendicular thereto, or an absorbing circular polarization element having a characteristic of absorbing a circularly-polarized beam of a predetermined rotation direction and transmitting a circularly-polarized beam of the opposite rotation direction.

According to the beam applying method as a second technique, a beam can be applied to the optical recording medium having the absorbing polarization element through a wavelength plate providing a predetermined angle difference between the recording operation and the reproducing operation in the optical axis direction.

Here, when the half-wavelength plate is used as the wavelength plate and the absorbing linear polarization element is used as the absorbing polarization element of the medium, it is possible to apply the linearly-polarized beam having a polarization direction parallel to the polarization axis direction of the absorbing linear polarization element at the time of performing a recording operation and to apply the linearly-polarized beam having a polarization direction perpendicular to the polarization axis direction of the absorbing linear polarization element at the time of performing a reproducing operation. In this way, when the linearly-polarized beam having a polarization direction parallel to the polarization axis direction of the absorbing linear polarization element is applied at the time of performing a recording operation, it is possible to allow the absorbing linear polarization element to absorb the beam incident on the medium. As a result, the beam does not reach the reflecting film at the time of performing a recording operation, thereby not generating the backward beam. By applying the linearly-polarized beam having a polarization direction perpendicular to the polarization axis direction of the absorbing linear polarization element at the time of performing a reproducing operation, it is possible to allow the absorbing linear polarization element to transmit the incident beam. As a result, the beam can reach the reflecting film, thereby obtaining the backward beam.

Alternatively, when the quarter-wavelength plate is used as the wavelength plate and the absorbing circular polarization element is used as the absorbing polarization element of the medium, the circularly-polarized beam of a predetermined rotation direction can be applied to the absorbing circular polarization element at the time of performing a recording operation and the circularly-polarized beam of the opposite rotation direction can be applied to absorbing circular polarization element at the time of performing a reproducing operation. When the circularly-polarized beam of a predetermined rotation direction is incident on the absorbing circular polarization element at the time of performing a recoding operation, the incident beam can be absorbed by the absorbing circular polarization element. As a result, the backward beam is not generated at the time of performing a recording operation. When the circularly-polarized beam of the opposite rotation direction is incident on the absorbing circular polarization element at the time of performing a reproducing operation, the incident beam can be transmitted by the absorbing circular polarization element. As a result, the backward beam can be obtained.

By the use of the beam applying method according to the second embodiment, it is possible not to generate the backward beam at the time of performing a recording operation and to properly obtain the backward beam at the time of performing a reproducing operation.

According to a third embodiment, there is provided a beam applying method of performing recording and reproducing operations on an optical recording medium, in which a signal is recorded and reproduced by applying a beam thereto and which has a recording layer on which the signal is recorded, and a reflecting polarization element formed below the recording layer. The beam applying method includes the steps of; emitting a beam to be applied to the optical recording medium; and driving a wavelength plate inserted into an optical system serving to guide the emitted beam to the optical recording medium so that the optical axis direction thereof has a predetermined angle difference at the time of performing a recording operation and reproduction.

The reflecting polarization element means a reflecting linear polarization element having a characteristic of transmitting a linearly-polarized beam of a polarization direction parallel to the polarization axis direction thereof and reflecting a linearly-polarized beam of a polarization direction perpendicular thereto, or a reflecting circular polarization element having a characteristic of transmitting a circularly-polarized beam of a predetermined rotation direction and reflecting a circularly-polarized beam of the opposite rotation direction.

It should be noted in the beam applying method according to the third embodiment that the reflecting film is not formed below the polarization element in the optical recording medium, unlike the first and second techniques. That is, as can be understood in consideration of the characteristic of the reflecting polarization element, in the third technique, the backward beam is not generated at the time of performing a recording operation by outputting the applied beam through the entire medium and the backward beam is obtained at the time of performing a reproducing operation by allowing the reflecting polarization element to reflect the applied beam.

According to the beam applying method as the third technique, a beam can be applied to the optical recording medium having the reflecting polarization element through the wavelength plate providing a predetermined angle difference in the optical axis direction between the recording operation and the reproducing operation.

For example, when the half-wavelength plate is used as the wavelength plate and the reflecting linear polarization element is used as the reflecting polarization element, the linearly-polarized beam having a polarization direction parallel to the polarization axis direction of the reflecting linear polarization element can be applied at the time of performing a recording operation and the linearly-polarized beam having a polarization direction perpendicular to the polarization axis direction of the reflecting linear polarization element can be applied at the time of performing a reproducing operation. When the linearly-polarized beam having a polarization direction parallel to the polarization axis direction of the reflecting linear polarization element can be applied at the time of performing a recording operation, the incident beam can be transmitted by the reflecting linear polarization element. As described above, since the reflecting film is not formed, the beam can be allowed to pass through the entire medium by allowing the reflecting linear polarization element to transmit the incident beam. As a result, it is possible not to generate the backward beam at the time of performing a recording operation. When the linearly-polarized beam having a polarization direction perpendicular to the polarization axis direction of the reflecting linear polarization element can be applied at the time of performing a reproducing operation, the incident beam can be reflected by the reflecting linear polarization element, thereby obtaining the backward beam.

Alternatively, when the quarter-wavelength plate is used as the wavelength plate and the reflecting circular polarization element is used as the reflecting polarization element of the medium, the circularly-polarized beam of a predetermined rotation direction can be applied to the reflecting circular polarization element at the time of performing a recording operation and the circularly-polarized beam of the opposite rotation direction can be applied to the reflecting circular polarization element at the time of performing a reproducing operation. When the circularly-polarized beam of a predetermined rotation direction is incident on the reflecting circular polarization element at the time of performing a recoding operation, the incident beam can be transmitted by the reflecting circular polarization element. As a result, the incident beam can be output through the entire medium, thereby not generating the backward beam. When the circularly-polarized beam of the opposite rotation direction is incident on the reflecting circular polarization element at the time of performing a reproducing operation, the incident beam can be transmitted by the reflecting circular polarization element. As a result, the backward beam can be obtained.

By the use of the beam applying method according to the third embodiment, it is possible not to generate the backward beam at the time of performing a recording operation and to properly obtain the backward beam at the time of performing a reproducing operation.

According to another embodiment, there is provided a recording and reproducing apparatus for performing recording and reproducing operations on an optical recording medium in which a signal is recorded and reproduced by applying a beam thereto. The recording and reproducing apparatus includes: an optical system configured to guide a beam emitted from a light source to the optical recording medium; a wavelength plate inserted into a predetermined position in an optical path of the optical system; and wavelength plate driving means for driving the wavelength plate so that the optical axis direction thereof is changed by a predetermined angle difference between the recording operation and the reproducing operation.

According to this configuration, it is possible to provide a recording and reproducing apparatus that does not generate a backward beam at the time. of performing a recording operation and that can properly generate the backward beam at the time of performing a reproducing operation, so as to correspond to the beam applying method according to the first to third embodiments.

According to the above-mentioned beam applying method, a backward beam is not generated at the time of performing a recording operation and the backward beam can be obtained at the time of performing a reproducing operation. Accordingly, it is possible to record only one kind of transmissive hologram at the time of performing a recording operation, thereby improving the SNR. Since the backward beam is obtained at the time of performing a reproducing operation, it is possible to properly reproduce a signal recorded on the recording layer.

According to the above-mentioned configuration, it is possible to provide a recording and reproducing apparatus that does not generate a backward beam at the time of performing a recording operation and that can properly generate the backward beam at the time of performing a reproducing operation, so as to correspond to the beam applying method.

Additional features and advantages are described herein, and will be apparent from the following Detailed Description and the figures.

DETAILED DESCRIPTION

Figure 1:
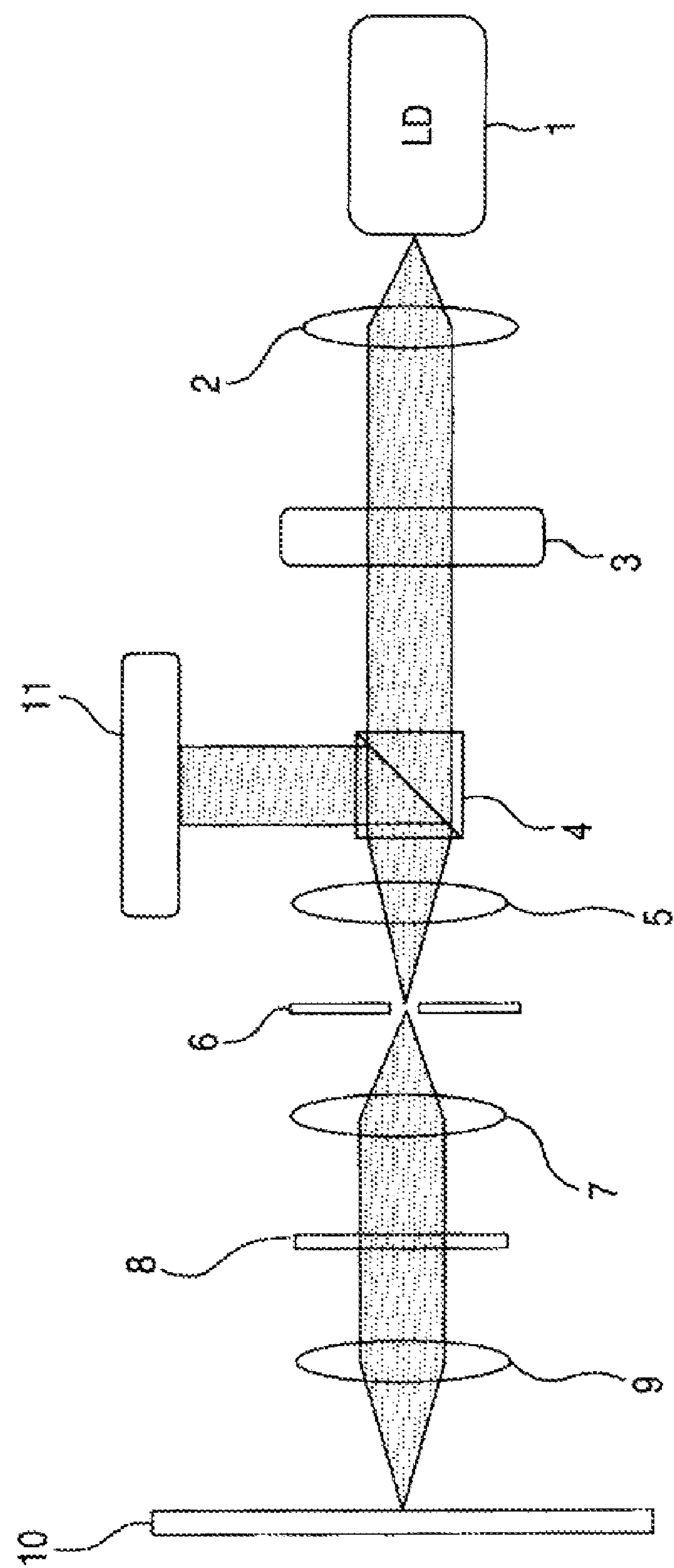
FIG. 1 is a diagram illustrating an internal configuration of a hologram recording and reproducing apparatus employing a coaxial system so as to explain basic hologram recording and reproducing operations.

The present application is described below in detail with reference to the changes according to an embodiment. The following description is outlined below:

1. Basic Hologram Recording and Reproducing Operation
2. Beam Applying Method
2-1. First Technique
2-2. Second Technique
2-3. Third Technique
2-4. Modified Example of Second Technique
2-5. Modified Example of Third Technique
2-6. Fourth Technique
2-7. Fifth Technique 1. Basic Hologram Recording and Reproducing Operation FIG. 1 is a diagram illustrating an internal configuration of a hologram recording and reproducing apparatus employing a coaxial system. In FIG. 1, only a configuration of an optical system of the recording and reproducing apparatus is shown and the other configuration is omitted.

As described above, in the coaxial system, a signal beam and a reference beam are disposed in the same axis, data are recorded in an interference pattern by applying the signal beam and the reference beam to a hologram recording medium set at a predetermined position, and data recorded in the interference pattern are reproduced by applying the reference beam to the hologram recording medium at the time of performing a reproducing operation.

In FIG. 1, a configuration of a recording and reproducing apparatus corresponding to a reflecting hologram recording medium having a reflecting film as a hologram recording medium is shown.

First, a laser diode (LD) 1 is disposed as a light source providing a laser beam for recording and reproducing. A laser diode mounted with an external resonator is employed as the laser diode 1 and the wavelength of the laser beam is, for example, 410 nm.

A beam emitted from the laser diode 1 passes through a collimator lens 2 and then enters a spatial light modulator (SLM) 3.

The SLM 3 includes, for example, a transmissive liquid crystal panel and pixels thereof are controlled in accordance with a driving signal from a driving circuit not shown. The SLM modulates the light intensity of an incident beam in accordance with recording data. Specifically, the ON/OFF of a beam can be controlled in the unit of pixel so that a pixel turned on by a driving signal transmits an incident beam and a pixel turned off does not transmit the incident beam. Data of "0" and "1" can be recorded in the unit of pixel, by means of the ON/OFF control of the SLM 3.

The beam modulated by the SLM 3 passes through a beam splitter 4, then passes through a relay lens optical system including a relay lens 5, a light-blocking mask 6, and a relay lens 7, passes through a quarter-wavelength plate 8, is concentrated by an objective lens 9, and then is applied to a hologram recording medium 10.

At the time of performing a recording operation, a signal beam modulated by the SLM 3 in accordance with the recording data and a reference beam having a ring shape as a concentric circle with the signal beam are generated as described later. That is, the signal beam and the reference beam generated in this way are concentrated on the hologram recording medium 10 through the above-mentioned path.

At the time of performing a reproducing operation, a beam from the laser diode 1 is incident on the SLM 3 through the collimator lens 2, similarly to the recording. The SLM 3 performs a reproducing spatial light intensity modulating operation on the incident beam to generate only a reference beam at the time of performing a reproducing operation. That is, at the time of performing a reproducing operation, the signal beam is not applied but only the reference beam is applied to the hologram recording medium 10.

With the application of the reference beam, a diffracted beam corresponding to the recording data on the hologram recording medium 10 as described later. The diffracted beam as a reflected beam from the hologram recording medium 10 passes through the objective lens 9 and is guided to the beam splitter 4 through the quarter-wavelength plate 8, the relay lens 7, the light-blocking mask 6, and the relay lens 5. The reflected beam from the hologram recording medium 10 guided through the above-mentioned path is reflected by the beam splitter 4 and the reflected beam is guided to an image sensor 11 as shown in the figure.

The image sensor 11 includes an image pickup device such as a CCD (Charge Coupled Device) sensor or a CMOS (Complementary Metal-Oxide Semiconductor) sensor and serves to receive the reflected beam (diffracted beam) from the hologram recording medium 10 guided as described above and to convert the received beam into an electrical signal.

Figure 2:
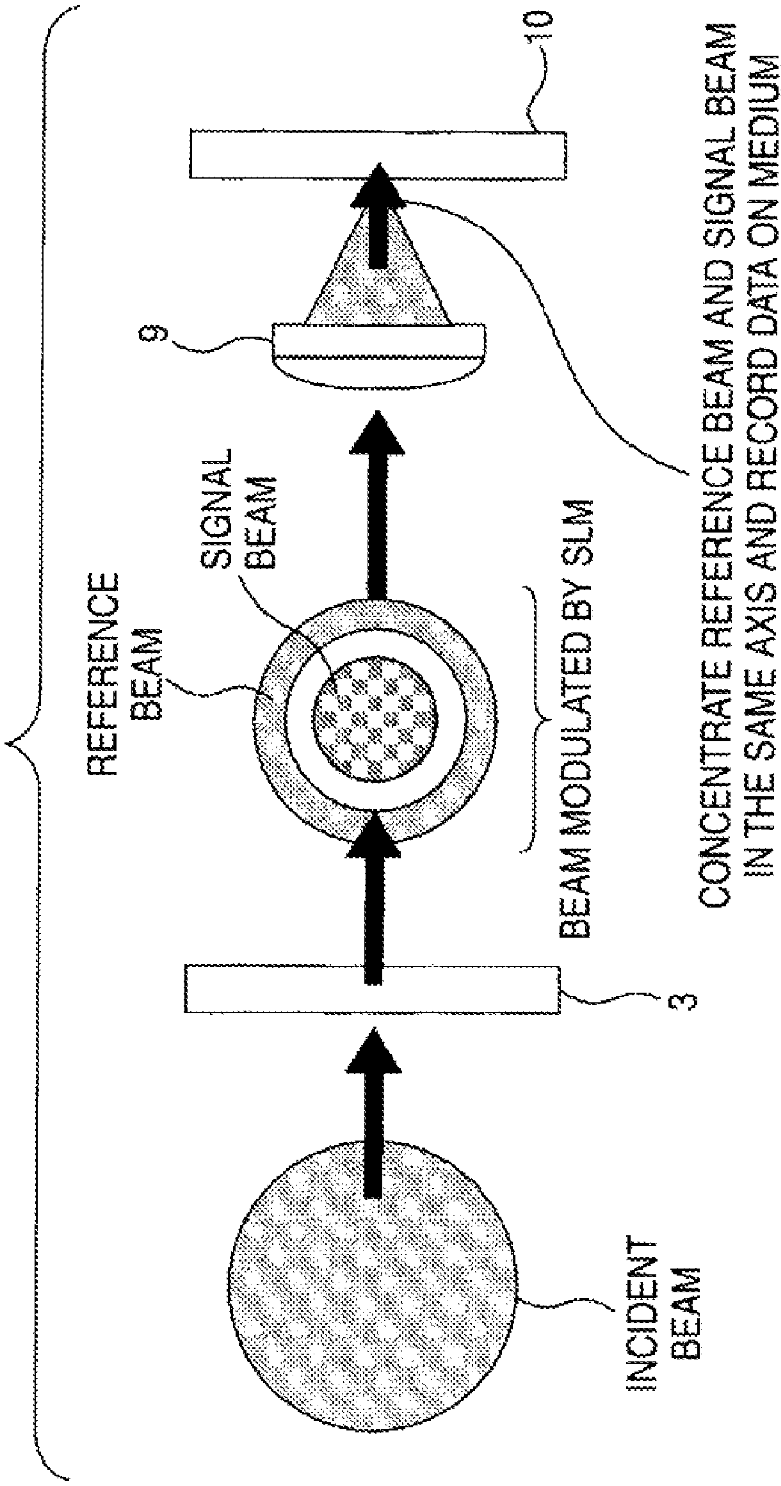
FIG. 2 is a diagram illustrating a method of recording data on a hologram recording medium.
Figure 3A:
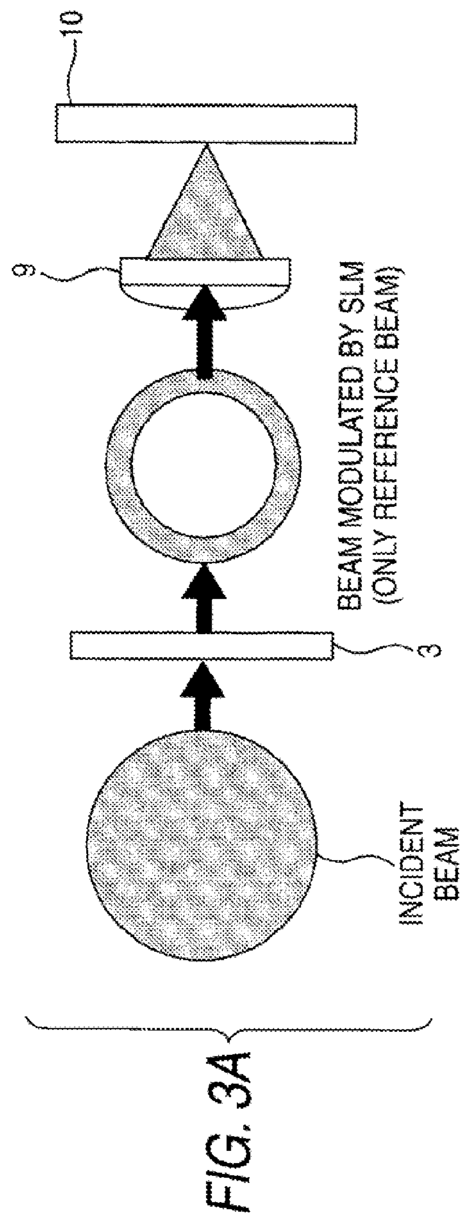
FIGS. 3A and 3B are diagrams illustrating a method of reproducing data from the hologram recording medium.
Figure 3B:
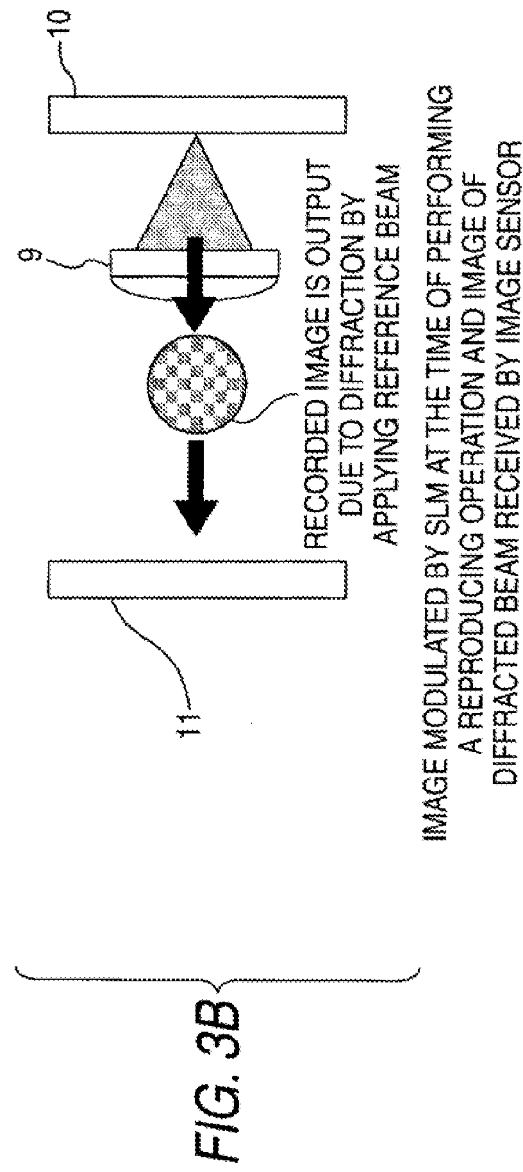

FIGS. 2, 3A, and 3B are diagrams illustrating a basic hologram recording and reproducing operation performed by the above-mentioned optical system. FIG. 2 shows a recording operation and FIGS. 3A and 3B show a reproducing operation.

In FIG. 2, only the SLM 3 and the objective lens 9 of the optical system shown in FIG. 1 are extracted and shown. Similarly, only the SLM 3 and the objective lens 9 are shown in FIG. 3A and only the objective lens 9 and the image sensor 11 are shown in FIG. 3B.

First, in the recording operation shown in FIG. 2, the SLM 3 modulates the intensity of the incident beam along with the reference beam on the basis of the recording data, so that the beam (called "signal beam") having a light intensity pattern based on a data pattern of "0" and "1" is arranged in a concentric circle.

The beams (that is, the reference beam and the signal beam) of which the intensity is modulated are concentrated on the hologram recording medium 10 by the use of the objective lens 9 and an interference pattern of the reference beam and the signal beam formed as a result is recorded on the hologram recording medium 10.

In the reproducing operation, first as shown in FIG. 3A, the SLM 3 performs a spatial light intensity modulating operation on the incident beam to generate only a reference beam and concentrates the generated reference beam on the hologram recording medium 10. At this time, the concentrated beam is diffracted by the interference pattern corresponding to the data pattern recorded on the hologram recording medium 10 and is output as a reflected beam from the hologram recording medium 10. That is, the diffracted beam has a light intensity pattern containing the recording data as shown in the figure and reproduces the data on the basis of the detection result of the intensity pattern of the diffracted beam detected by the image sensor 11.

Figure 4:
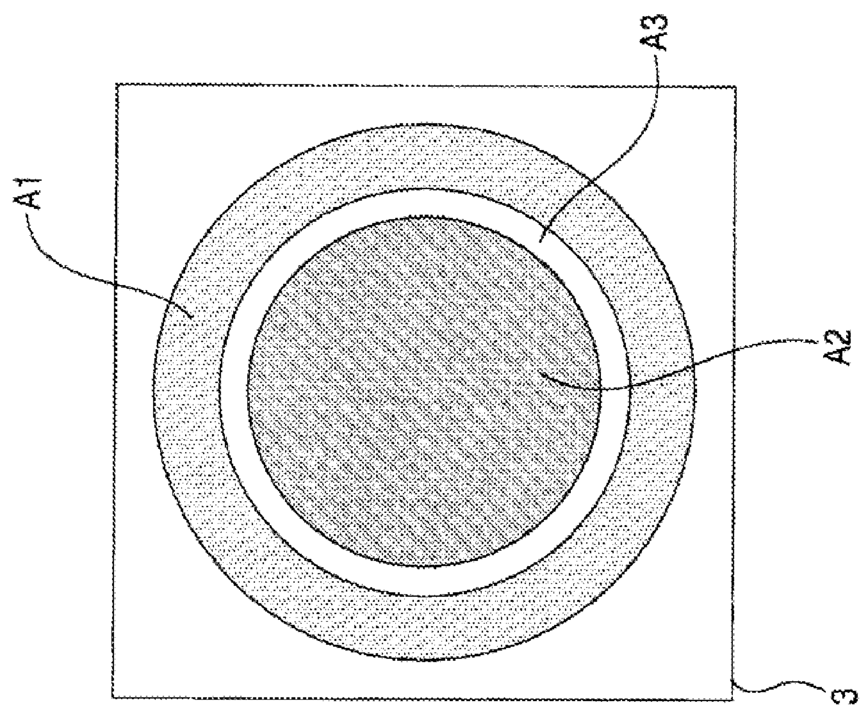
FIG. 4 is a diagram illustrating a reference beam area, a signal beam area, and a gap area defined in a spatial light modulator.

The SLM 3 generates the reference beam or the signal beam at the time of performing a recording operation/reproduction. Accordingly, in the SLM 3, a reference beam area A1, a signal beam area A2, and a gap area A3 shown in FIG. 4 are defined. That is, as shown in FIG. 4, a predetermined circular area including the center of the SLM 3 is defined as the signal beam area A2. The reference beam area A1 having a ring shape concentric with the signal beam area A2 is defined in the outer periphery thereof with the gap area A3 interposed therebetween.

The gap area A3 serves as an area for preventing the reference beam from leaking from the signal beam area A2 to act as noises.

At the time of performing a recording operation, predetermined pixels in the reference beam area A1 are set to “1” (light intensity=high), the other pixels therein are set to “0” (light intensity=low), all the pixels in the gap area A3 and outside the reference beam area A1 are set to “0”, and the pixels in the signal beam area A2 are set to patterns of “0” and “1” corresponding to the recording data, thereby generating and outputting the reference beam and the signal beam sown in FIG. 2.

At the time of performing a reproducing operation, the pixels in the reference beam area A1 are set to the same pattern of “0” and “1” as those at the time of performing a recording operation and the pixels in the other areas are set to “0”, thereby generating and outputting only the reference beam as shown in FIG. 3A.

2. Beam Applying Method 2-1. First Technique

In this embodiment, in consideration of the known problems, there is suggested a technique that can record only one kind of transmissive hologram at the time of performing recording and reproducing operations on a hologram recording medium. Now, a first technique thereof is described.

In the first technique, a quarter-wavelength plate and a polarizing plate are formed in the hologram recording medium and a quarter-wavelength plate is formed in the recording and reproducing apparatus.

Figure 5:
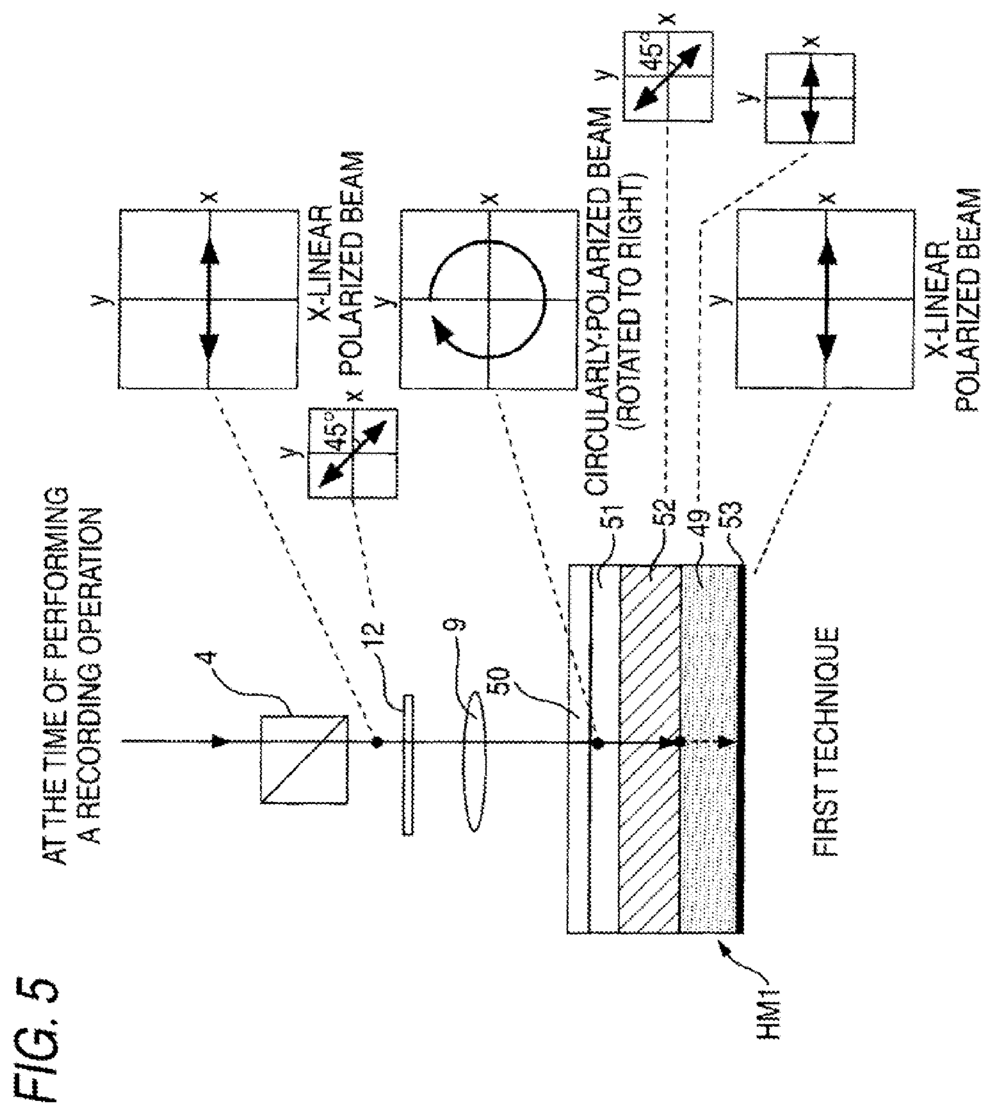
FIG. 5 is a diagram illustrating a first technique of a beam applying method according to an embodiment, where data are recorded.
Figure 6:
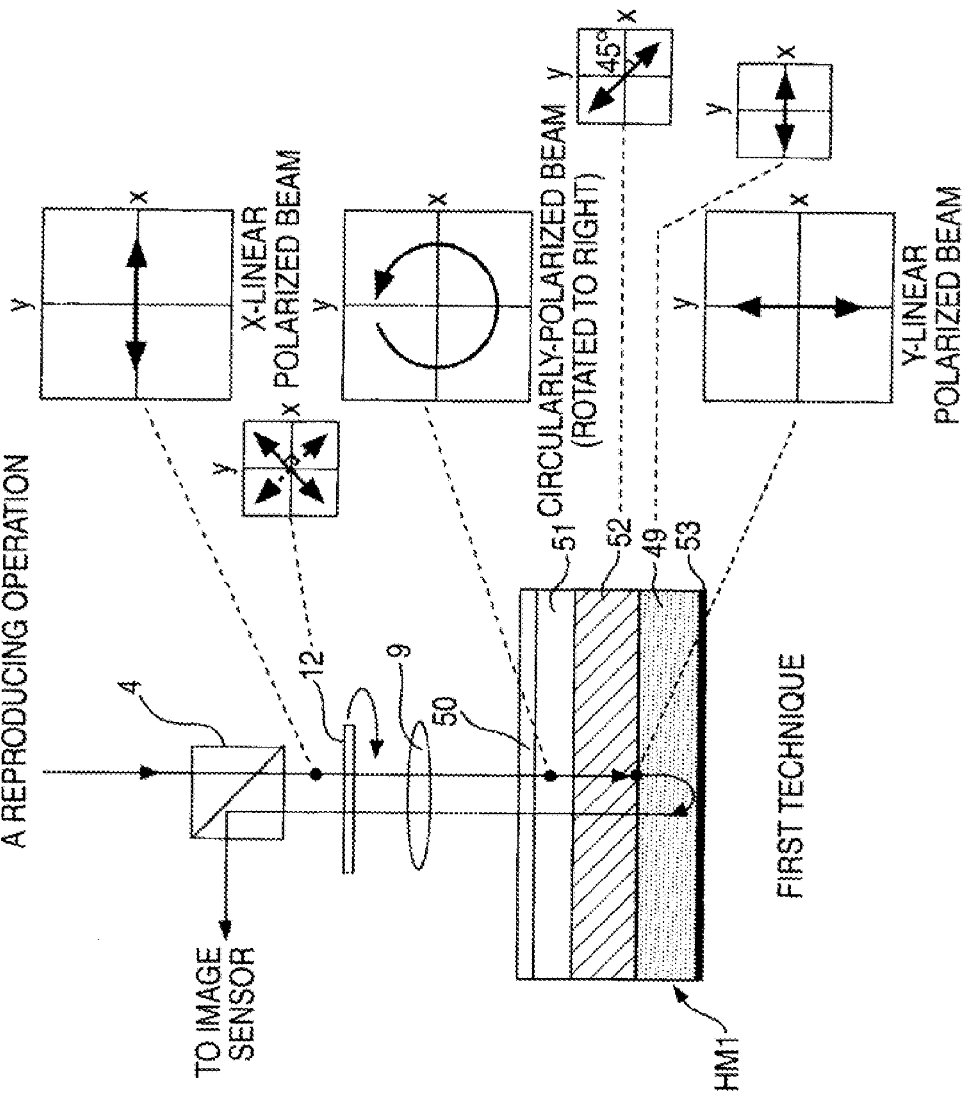
FIG. 6 is a diagram illustrating the first technique of the beam applying method according to the embodiment, where data are reproduced.

FIGS. 5 and 6 are diagrams illustrating the first technique of the beam applying method according to this embodiment, where a hologram recording medium HM1 (sectional view) used in the first technique, a beam splitter 4, an objective lens 9 disposed in the apparatus, a quarter-wavelength plate 12, and a beam applied to the hologram recording medium HM1 through the beam splitter 4, the quarter-wavelength plate 12, and the objective lens 9 are schematically shown.

First, a structure of the hologram recording medium HM1 shown in the figures is described. The hologram recording medium HM1 is a reflecting hologram recording medium having a reflecting film 53. A polarizing plate 49 is formed on the reflecting film 53 and a quarter-wavelength plate 52 is formed on the polarizing film 49. A recording layer 51 on which a signal is recorded with an interference pattern of a reference beam and a signal beam is formed on the quarter-wavelength plate 52. A cover glass 50 configured to protect the recording layer 51 is formed on the recording layer.

A beam applying method as the first technique using the hologram recording medium HM1 will be described with reference to FIGS. 5 and 6.

FIG. 5 shows a recording operation.

In FIG. 5, the polarization directions of a beam incident on the quarter-wavelength plate 12, a beam incident on the recording layer 51 in the hologram recording medium HM1, a beam incident on the polarizing plate 49, and a beam incident on the reflecting film 53 in the hologram recording medium HM1, an optical axis direction of the quarter-wavelength plate 12, and an optical axis direction of the quarter-wavelength plate 52 are shown with respect to an X axis and a Y axis perpendicular thereto.

Here, for example, an X-linear polarized beam of which the polarization direction is the X axis direction is incident on the quarter-wavelength plate 12 of the apparatus.

In the recording operation shown in FIG. 5, it is assumed that the optical axis direction of the quarter-wavelength plate 12 forms an angle of 45° along with the polarization direction of the incident beam. That is, the optical axis direction of the quarter-wavelength plate 12 is inclined by 45° about the X axis direction as shown in the figure.

In the hologram recording medium HM1, as shown in the figure, the optical axis direction of the quarter-wavelength plate 52 is made to be parallel to the optical axis direction of the quarter-wavelength plate 12 of the apparatus. In this case, the optical axis direction of the quarter-wavelength plate 52 of the hologram recording medium HM1 is set to be inclined by 45° about the X axis direction.

In the hologram recording medium HM1, the polarization axis direction of the polarizing plate 49 formed below the quarter-wavelength plate 52 forms an angle of 45° about the optical axis direction of the quarter-wavelength plate 52 as shown in the figure. Specifically, the polarization axis direction of the polarizing plate 49 is parallel to the X axis direction.

At the time of performing the recording operation, since the optical axis direction of the quarter-wavelength plate 12 is parallel to the optical axis direction of the quarter-wavelength plate 52 of the hologram recording medium HM1, the angle formed by the optical axis direction of the quarter-wavelength plate 52 of the apparatus and the X axis direction defined in the optical system of the apparatus need to be 45°. Accordingly, the hologram recording medium HM1 used in the first technique is attached to the apparatus, for example, by a positioning member, so that the optical axis direction of the quarter-wavelength plate 52 is inclined by 45° about the X axis direction defined in the optical system and the attachment angle is fixed.

In FIG. 5, since the polarization direction of the beam incident on the quarter-wavelength plate 12 and the optical axis direction of the quarter-wavelength plate 12 are set as described above, a right-rotated circularly polarized beam is applied to the recording layer 51 of the hologram recording medium HM1, as shown in the figure, at the time of performing the recording operation.

Since the optical axis direction of the quarter-wavelength plate 52 is set as described above, the right-rotated circularly-polarized beam incident on the quarter-wavelength plate 52 through the recording layer 51 is converted into the X-linear polarized beam by the quarter-wavelength plate 52 and the X-linear polarized beam is incident on the polarizing plate 49.

As known widely, the polarizing plate 49 has a characteristic of absorbing a linearly-polarized beam of which the polarization direction is parallel to the polarization axis direction thereof and transmitting a linearly-polarized beam of which the polarization direction is perpendicular to the polarization axis direction thereof. In this case, the polarization axis direction of the polarizing plate 49 is parallel to the X axis direction as described above. Accordingly, by inputting the X-linear polarized beam, the X-linear polarized beam incident on the medium is absorbed by the polarizing plate 49.

Since the incident beam is absorbed by the polarizing plate 49, the beam does not reach the reflecting film 53 as the underlying layer. That is, at the time of performing a recording operation, the reflected beam (that is, backward beam) from the hologram recording medium HM1 is not generated.

Figure 26A:
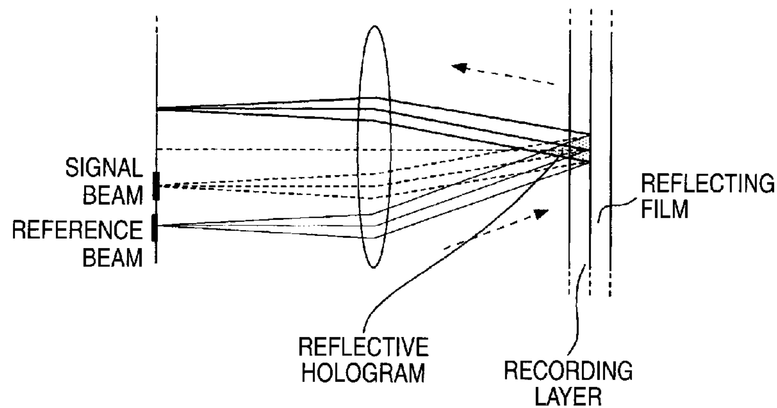
FIGS. 26A and 26B are diagrams illustrating the patterns of holograms that can be generated at the time of recording data on a reflecting hologram recording medium.
Figure 26B:
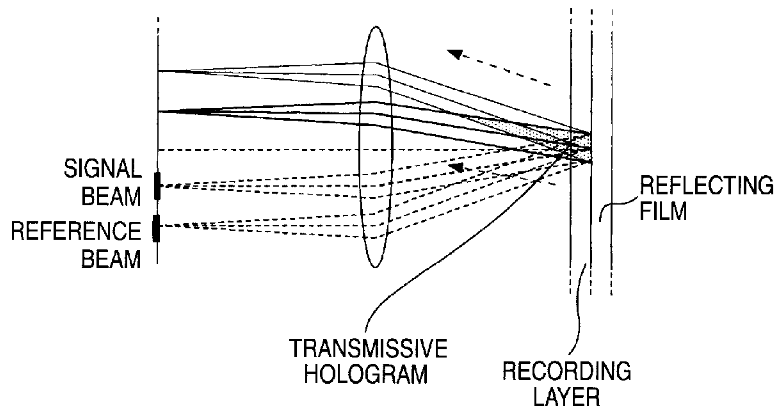
Figure 27A:
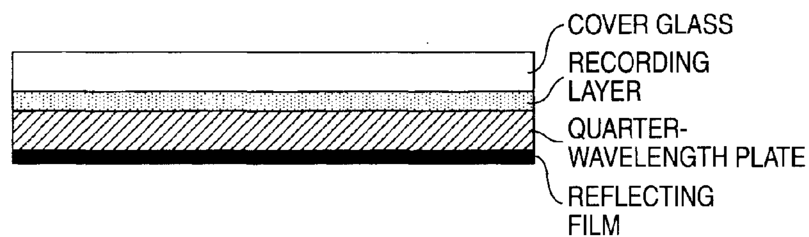
FIGS. 27A and 27B are diagrams illustrating a known method of preventing a reflective hologram from being recorded.
Figure 27B:
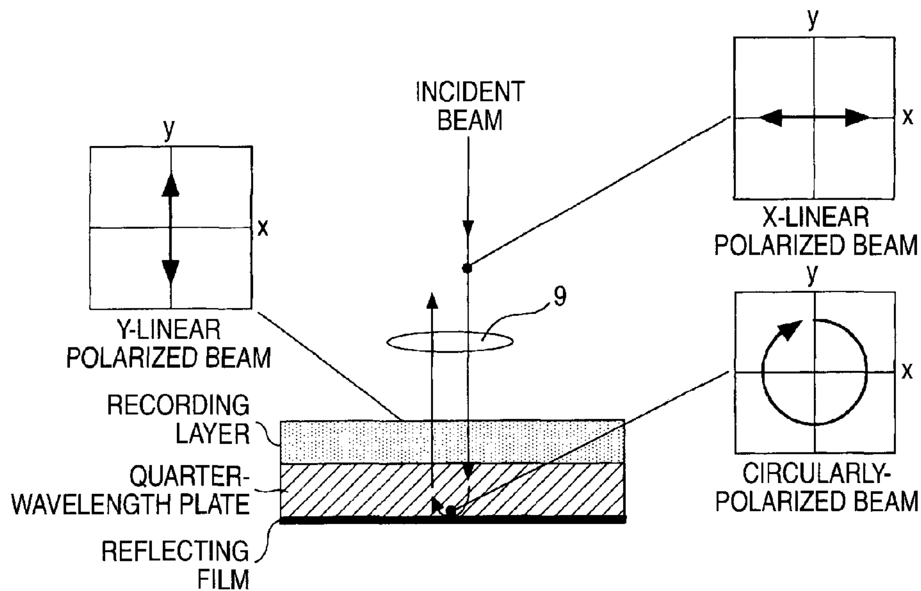

Since the backward beam is not generated at the time of performing a recording operation, it is possible to prevent the reflective hologram form being generated and to prevent the transmissive hologram (pattern D) resulting from “reference beam (backward path)×signal beam (backward path)” shown in FIG. 27B from being generated. According to the first technique, only one kind of transmissive hologram (pattern A) resulting from "reference beam (backward path)×signal beam (backward path)" shown in FIG. 26A can be recorded on the hologram recording medium HM1.

FIG. 6 shows a reproducing operation.

In FIG. 6, the polarization directions of a beam incident on the quarter-wavelength plate 12, a beam incident on the recording layer 51 in the hologram recording medium HM1, a beam incident on the polarizing plate 49, and a beam incident on the reflecting film 53, an optical axis direction of the quarter-wavelength plate 12, and the optical axis direction of the quarter-wavelength plate 52 are shown with respect to the X axis and the Y axis perpendicular thereto.

As described above, in the first technique, since the hologram recording medium HM1 is attached to the apparatus at an attachment angle fixed so that the optical axis direction of the quarter-wavelength plate 52 is inclined by 45° about the X axis direction, the optical axis direction of the quarter-wavelength plate 52 of the hologram recording medium HM1 and the polarization axis direction of the polarizing plate 49 are the same as shown in FIG. 5.

As shown in FIG. 6, in the reproducing operation, a beam is applied to the hologram recording medium HM1 in a state where the quarter-wavelength plate 12 of the apparatus is rotated by 90° from the state shown in FIG. 5. In this way, by rotating the quarter-wavelength plate 12 by 90°, the optical axis direction of the quarter-wavelength plate 12 is changed to a direction perpendicular to that of the recording operation.

Since the optical axis direction of the quarter-wavelength plate 12 is changed to the direction perpendicular to that of the recording operation, the beam (a beam incident on the recording layer 51) applied to the hologram recording medium HM1 is a left-rotated circularly-polarized beam which is opposite to that of the recording operation. In this case, since the optical axis direction of the quarter-wavelength plate 52 of the hologram recording medium HM1 is parallel to that of the recording operation, the left-rotated circularly-polarized beam is converted into the Y-linear polarized beam by the quarter-wavelength plate 52. Accordingly, since the linearly-polarized beam having a polarization direction perpendicular to the polarization axis direction (X axis direction) is incident on the polarizing plate 49, the beam incident on the medium is transmitted by the polarization plate 49.

Since the incident beam is transmitted by the polarizing plate 49, the reflected beam (backward beam) from the reflecting film 53 is obtained at the time of performing a reproducing operation. As shown in the figure, the backward beam is output from the hologram recording medium HM1 through the polarizing plate 49, the quarter-wavelength plate 52, the recording layer 51, and the cover glass 50, is then reflected by the beam splitter 4 through the objective lens 9 and the quarter-wavelength plate 12, and thus is guided to an image sensor 11 not shown.

In the first technique, the quarter-wavelength plate 12 disposed in the apparatus is driven so that the angle difference of 90° is given to the optical axis thereof at the time of performing a recording operation and a reproducing operation.

Accordingly, the circularly-polarized beams of the opposite rotation directions can be applied to the hologram recording medium HM1 at the time of performing a recording operation and a reproducing operation, respectively. As a result, depending on the characteristics of the quarter-wavelength plate 52 and the polarizing plate 49 formed in the hologram recording medium HM1, the beam applied to the medium can be absorbed by the polarizing plate 49 at the time of performing a recording operation and the applied beam can be transmitted by the polarizing plate 49 at the time of performing a reproducing operation to obtain the reflected beam (backward beam) from the reflecting film 53. Accordingly, it is possible not to generate the backward beam and to record only one kind of transmissive hologram at the time of performing a recording operation. On the other hand, at the time of performing a reproducing operation, it is possible to properly obtain the reproduced beam.

The hologram recording medium HM1 in which the recording layer 51, the quarter-wavelength plate 52, the polarizing plate 49, and the reflecting film 53 are sequentially formed from the uppermost is used in the first technique. In the hologram recording medium HM1, since a circularly-polarized beam of a predetermined rotation direction (for example, right-rotated circularly-polarized beam) is applied to the hologram recording medium HM1 at the time of performing a recording operation and the circularly-polarized beam of the opposite rotation direction (for example, left-rotated circularly-polarized beam) is applied thereto at the time of performing a reproducing operation, it is possible to record only one kind of transmissive hologram at the time of performing a recording operation and to properly obtain the reproduced beam at the time of performing a reproducing operation. Accordingly, according to the hologram recording medium HM1, it is possible to provide an optical recording medium that can allow only one kind of transmissive hologram to be recorded at the time of performing a recording operation and that can allow a reproduced beam to be obtained at the time of performing a reproducing operation, so as to correspond to the recording and reproducing apparatus having the above-mentioned configuration.

A configuration of the recording and reproducing apparatus for implementing the first technique will be described now.

Figure 7:
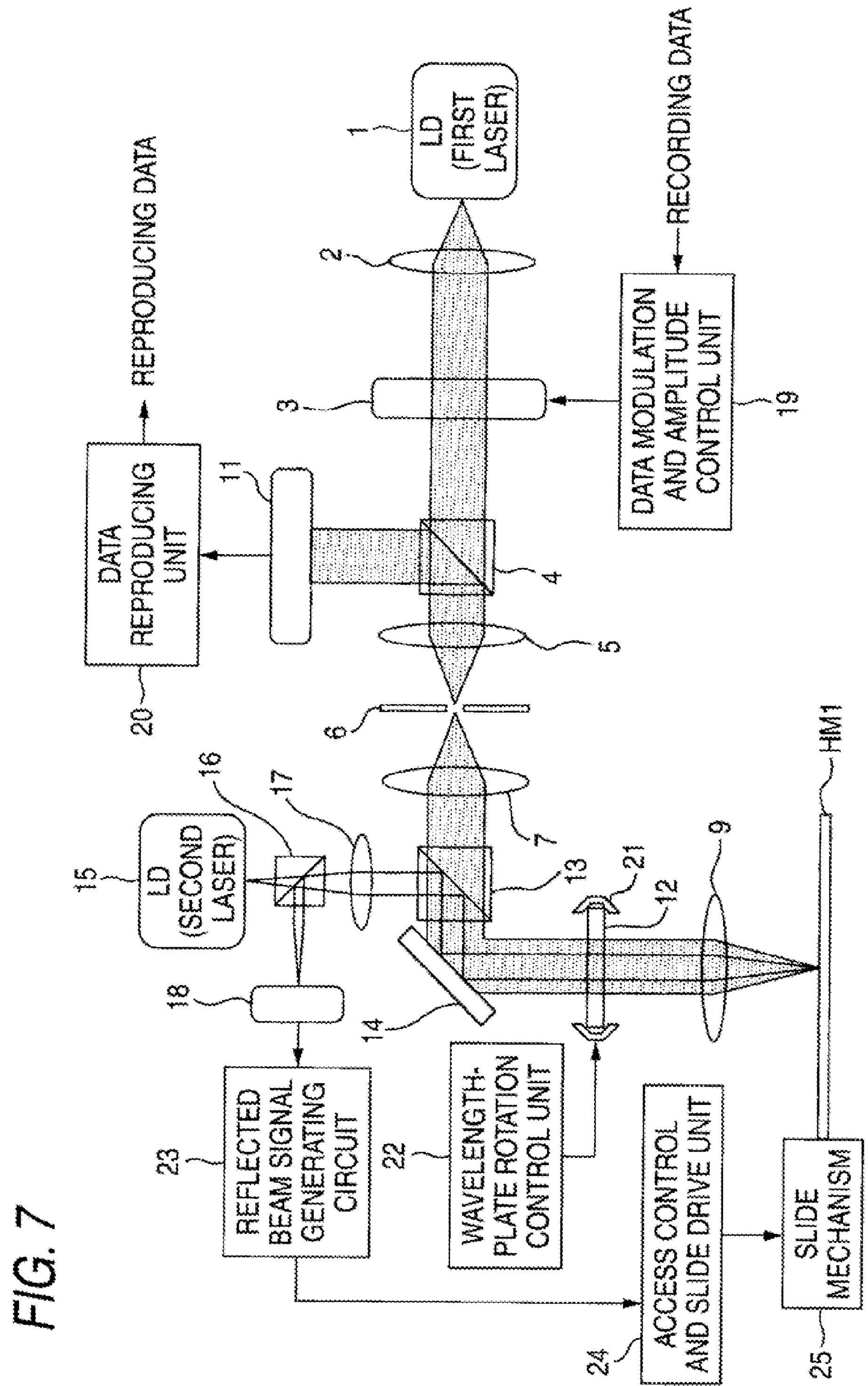
FIG. 7 is a diagram illustrating an internal configuration of a recording and reproducing apparatus for implementing the first technique (and second and third techniques).

The internal configuration thereof is shown in FIG. 7. In FIG. 7, the elements having been described with reference to FIG. 1 are denoted by like reference numerals and description thereof is omitted.

First, in the recording and reproducing apparatus shown in FIG. 7, the hologram recording medium HM1 is set to a predetermined position in the apparatus. As described above, the hologram recording medium HM1 is attached to the apparatus with a fixed attachment angle so that the optical axis direction of the quarter-wavelength plate 52 is inclined by 45° about the X axis direction defined in the optical system of the recording and reproducing apparatus.

The hologram recording medium HM1 attached to the recording and reproducing apparatus can be held to be slidable by a slide mechanism 25 shown in the figure.

In the recording and reproducing apparatus, since the hologram recording medium HM1 can slide by the use of the slide mechanism 25, it is possible to record and reproduce a signal with respect to any position of the hologram recording medium HM1.

In the recording and reproducing apparatus, the access to any position of the hologram recording medium HM1 is possible by the use of the slide mechanism 25. Position information is recorded in advance in the hologram recording medium HM1 so as to allow the recording and reproducing apparatus to control a recording or reproducing position on the medium.

Specifically, a particular recording layer on which the position information should be recorded is formed in addition to the recording layer 51 in which a hologram is recorded and reproduced.

In FIGS. 5 and 6, the structure of the hologram recording medium HM1 is schematically shown. The actual structure of the hologram recording medium HM1 is as shown in FIG. 8.

Figure 8:
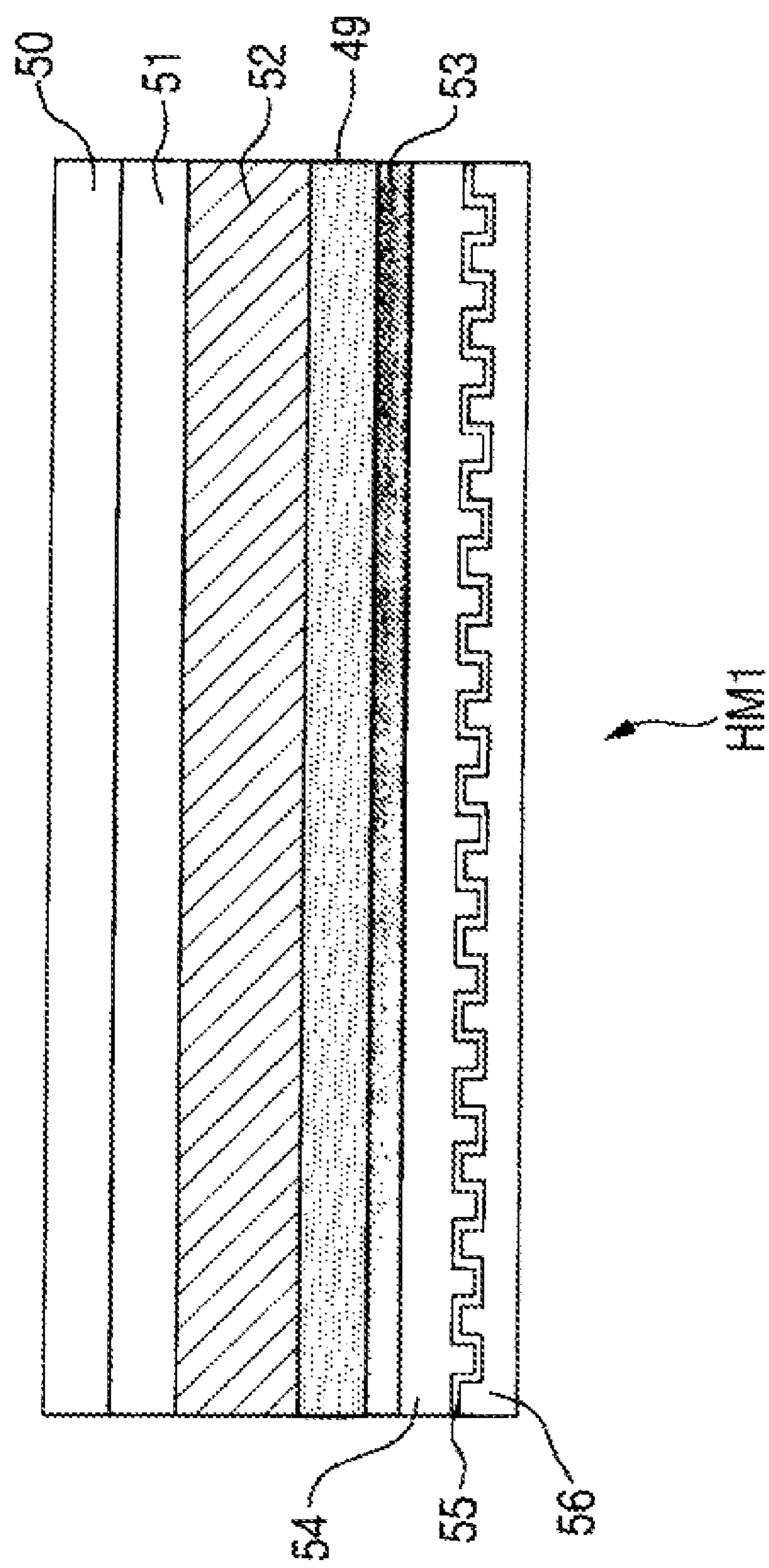
FIG. 8 is a diagram illustrating a sectional structure of a hologram recording medium used in the first technique.

As shown in FIG. 8, in the hologram recording medium HM1, the cover glass 50, the recording layer 51, the quarter-wavelength plate 52, the polarizing plate 49, and the reflecting film 53, which are also shown in FIGS. 5 and 6, are sequentially formed from the uppermost. In addition, an intermediate layer 54, a reflecting film 55, and a substrate 56 are formed below the reflecting film 53 as shown in the figure.

In this case, the substrate 56 is a resin substrate made of, for example, polycarbonate and has a pitted surface, in which information is recorded by an uneven sectional shape (combination of pits and lands), formed on the surface thereof. That is, information such as the position information is recorded on the pitted surface.

For example, the reflecting film 55 is formed on the pitted surface of the substrate 56. By bonding the substrate 56 having the reflecting film 55 formed thereon to the bottom of the reflecting film 53 by the use of an adhesive material such as resin as the intermediate layer 54, the sectional structure of the hologram recording medium HM1 shown in FIG. 8 is formed.

In the hologram recording medium HM1 having the above-mentioned sectional structure, it should be noted that the polarizing plate 49 and the reflecting film 53 are configured to have wavelength selectivity as shown in the figure. Specifically, the polarizing plate 49 and the reflecting film 53 do not perform their functions in response to the laser beam having a wavelength of 410 nm used to record and reproduce a hologram, but are configured to transmit the laser beam having a wavelength of 650 nm which is applied to read information recorded in the information recording layer (pitted surface) on the substrate 56.

According to the above description of the first technique, the beam incident on the hologram recording medium HM1 is absorbed by the polarizing plate 49. Accordingly, if the polarizing plate 49 does not have the wavelength selectivity, the laser beam (650 nm) used to read information on the substrate 56 is also absorbed by the polarizing plate 49, thereby not reading the information. Therefore, the polarizing plate 49 should have the wavelength selectivity.

When the polarizing plate 49 can transmit the beam but the reflecting film 53 does not have the wavelength selectivity, the transmitted laser beam is reflected by the reflecting film 53 and thus the laser beam cannot reach the pitted surface. Accordingly, the reflecting film 53 should also have the wavelength selectivity.

It will be described again with reference to FIG. 7.

As shown in FIG. 7, the recording and reproducing apparatus includes the laser diode 1, the collimator lens 2, the SLM 3, the beam splitter 4, the relay lens 5, the light-blocking mask 6, the relay lens 7, and the image sensor 11, which are described with reference to FIG. 1.

In this case, as described later, since a second laser 15 applying a laser beam having a different wavelength is disposed, the above-mentioned laser diode 1 is referred to as a first laser 1 for the purpose of discrimination thereof.

In this case, a beam emitted from the first laser 1 and output from the relay lens 7 passes through the dichroic mirror 13, is reflected by the mirror 14 to fold back the optical axis thereof by 90°, and is then incident on the quarter-wavelength plate 12 shown in FIGS. 5 and 6. The beam passing through the quarter-wavelength plate 12 is applied to the hologram recording medium HM1 set at a predetermined position through the objective lens 9 as described above.

Here, the recording and reproducing apparatus is provided with a data modulation and amplitude control unit 19 as a configuration for performing a light intensity modulating function of the SLM 3 corresponding to the recording data described with reference to FIG. 2. A data reproducing unit 20 acquiring reproduced data on the basis of an image signal detected by the image sensor 11 is also provided.

The recording data to be recorded on the hologram recording medium HM1 is input to the data modulation and amplitude control unit 19. The data modulation and amplitude control unit 19 serves to control the light intensity modulating operation (particularly, a light intensity modulating operation in the signal beam area A2) of the SLM 3 in accordance with the recording data at the time of performing a recording operation.

Specifically, a record modulation and encoding process in accordance with a predetermined recording format is performed on the input recording data. For example, a record modulation and encoding process of converting 1 byte (=8 bits) of recording data into a square block-like data arrangement of 4×4=16 bits is known as a known sparse encoding process in a hologram recording and reproducing system.

The block-like data arrangement obtained by the encoding process is arranged in a sheet of hologram page based on a recording format (which is called "mapping"). The hologram page means the entire data arrangement filled in the signal beam area A2. That is, the hologram page is a data unit which can be recorded at a time by the interference between the signal beam and the reference beam.

In this way, by mapping the recording data, a data pattern of "0" and "1" in the signal beam area A2 is obtained.

At the time of performing a recording operation, the data modulation and amplitude control unit 19 acquires the data pattern in the signal beam area A2 and generates a data pattern in which predetermined pixels in the reference beam area A1 are set to "1", the other pixels are set to "0", and all the pixels in the gap area A3 and outside the reference beam area A1 are set to "0." A data pattern corresponding to the entire effective pixels of the SLM 3 is generated thereon from the generated data pattern and the data pattern in the signal beam area A2.

At the time of performing a recording operation, the data modulation and amplitude control unit 19 sequentially acquires the data pattern corresponding to the entire effective pixels of the SLM 3 from the input recording data and controls the driving of the pixels of the SLM 3 on the basis of the data pattern. Accordingly, a reference beam corresponding to a predetermined ON/OFF pattern and a signal beam of which the ON/OFF pattern varies depending on the details of the recording data are output from the SLM 3 at the time of performing a recording operation.

The data modulation and amplitude control unit 19 serves to generate only a reference beam at the time of performing a reproducing operation.

First, the data modulation and amplitude control unit generates a data pattern in which pixels in the reference beam area A 1 are set to the same pattern of "0" and "1" as the recording operation and pixels in the other area are all set to "0" bit. At the time of performing a reproducing operation, the pixels of the SLM 3 are controlled on the basis of the data pattern. Accordingly, it is possible to output only the reference beam from the SLM 3 at the time of performing a reproducing operation.

By applying the reference beam to the hologram recording medium HM1, a reproduced signal beam is obtained by a diffracted beam corresponding to the recording data recorded in the hologram recording medium HM1. The reproduced signal beam is a reflected beam from the hologram recording medium HM1 and is guided to the image sensor 11 to form an image.

The data reproducing unit 20 detects the values of the pixels in a hologram page from image signals sequentially obtained by the image sensor 11 with the image formation of the reproduced signal beam and acquires the reproduced data on the basis of the detection result. Specifically, by performing a process of decoding encoded signals encoded at the time of performing a recording operation on the basis of the values of the pixels, block-like data of 4×4=16 as described above are converted into data in the unit of 1 byte, thereby reproducing the recording data.

In the recording and reproducing apparatus shown in the figure, as shown in FIG. 8, the second laser 15, the beam splitter 16, the collimator lens 17, the dichroic mirror 13, the photo detector 18, and the reflected beam signal generating circuit 23 are disposed as a configuration for reading information recorded on the pitted surface formed in the substrate 56 of the hologram recording medium HM1.

The second laser 15 emits a laser beam having a wavelength (for example, 650 nm) different from the wavelength (for example, 410 nm) of the first laser 1. The beam emitted from the second laser 15 passes through the beam splitter 16 and then enters the dichroic mirror 13 through the collimator lens 17.

An incident beam of which the light source is the second laser 15 is reflected by the dichroic mirror 13 and the reflected beam is guided to the mirror 14 as shown in the figure. The optical path after the mirror 14 is the same as the beam of which the light source is the first laser 1. That is, the beam of which the light source is the second laser 15 is applied to the hologram recording medium HM1 through the quarter-wavelength plate 12 and the objective lens 9.

The beam of which the light source is the second laser 15 and which has been applied to the hologram recording medium HM1 is reflected by the reflecting film 56 formed on the pitted surface of the substrate 56 the hologram recording medium HM1. The reflected beam passes through the objective lens 9, the quarter-wavelength plate 12, and the mirror 14, is then reflected by the dichroic mirror 13, and then is incident on the beam splitter 16 through the collimator lens 17. As shown in the figure, the beam incident on the beam splitter 16 from the collimator lens 17 is reflected by the beam splitter 16 and is guided to the photo detector 18.

The photo detector 18 receives the reflected beam input through the above-mentioned path and acquired from the reflecting film 56 on the pitted surface, converts the received beam into an electrical signal, and supplies the electrical signal to the reflected beam signal generating circuit 23. In this case, divisional detectors used in the field of an optical disk are employed as the photo detector 18. The reflected beam signal generating circuit 23 is supplied with detection signals from plural, for example, 4, detectors.

The reflected beam signal generating circuit 23 acquires a signal (position information signal) indicating position information on the hologram recording medium HM1 on the basis of the electrical signal from the photo detector 18. The position information signal is supplied to the access control and slide driving unit 24 as shown in the figure.

The access control and slide control unit 24 drives the slide mechanism 25 so that the position information indicated by the position information signal is matched with instructed position information on the basis of the position information signal input from the reflected beam signal generating circuit 23 and the position information instructed by a control unit not shown to slidably move the hologram recording medium HM1, thereby moving the recording or reproducing position to the instructed position. That is, by allowing the access control and slide driving unit 24 to control the driving of the slide mechanism 25, the access to the hologram recording medium HM1 is controlled.

In the recording and reproducing apparatus, a rotational driving unit 21 and a wavelength plate rotation control unit 22 are provided as a configuration for rotationally driving the quarter-wavelength plate 12.

First, the rotational driving unit 21 is configured to hold the quarter-wavelength plate 12 with the quarter-wavelength plate 12 interposed between the mirror 14 and the objective lens 9 in the optical path and to rotationally drive the held quarter-wavelength plate 12. Specifically, since the rotational driving unit 21 includes a motor and is configured to supply the rotational driving force of the motor to the quarter-wavelength plate 12, it can rotationally drive the quarter-wavelength plate 12.

The wavelength plate rotation control unit 22 controls the rotation of the motor of the rotational driving unit 21 so that the rotation angle of the quarter-wavelength plate 12 is changed by 90° in the recording operation and the reproducing operation. Specifically, the wavelength plate rotation control unit controls the rotation of the motor so that the rotation angle of the quarter-wavelength plate 12 is 45° at the time of performing a recording operation and the rotation angle of the quarter-wavelength plate 12 is 45+90=135° at the time of performing a reproducing operation.

Accordingly, as described with reference to FIGS. 5 and 6, it is possible to drive the quarter-wavelength plate 12 so that the angle difference of 90° in the optical axis direction is given at the time of performing a recording operation and a reproducing operation.

In the description of the first technique with reference to FIGS. 5 and 6, it is assumed that the optical axis direction of the quarter-wavelength plate 12 at the time of performing a recording operation is inclined by 45° about the X axis direction defined in the optical system.

Accordingly, in order to establish the first technique, the optical axis direction of the quarter-wavelength plate 12 is inclined by 45° about the X axis direction of the optical system when the rotation angle of the quarter-wavelength plate 12 is 45° which is used as a reference by the wavelength plate rotation control unit 22. That is, the relation between the recognized state of the rotation angel (that is, the rotation angle of the motor of the rotational driving unit 21) of the quarter-wavelength plate 12 recognized by the wavelength plate rotation control unit 22 and the attachment angle of the quarter-wavelength plate 12 to the rotational driving unit 21 is adjusted so that the optical axis direction of the quarter-wavelength plate 12 is inclined by 45° about the X axis direction when it is recognized by the wavelength plate rotation control unit 22 that the rotation angle of the quarter-wavelength plate 12 is 45°

By trying this adjustment, under the rotation control of the wavelength plate rotation control unit 22, the optical axis direction of the quarter-wavelength plate 12 is inclined by 45° about the X axis direction at the time of performing a recording operation and is rotated by 90° from the state at the time of performing a reproducing operation. As a result, the first technique can be correctly established.

In the technique of adjusting the relation between the recognized state of the rotation angle of the motor in the rotational driving unit 21 recognized by the wavelength plate rotation control unit 22 and the attachment angle of the quarter-wavelength plate 12 to the rotational driving unit 21, it is assumed that the wavelength plate rotation control unit 22 controls the rotation angle of the motor (the rotation angle of the quarter-wavelength plate 12). For example, when the wavelength plate rotation control unit 22 performs a rotation control operation of merely switching the rotation direction of the motor, a physical stopper that restricts the rotation angle of the quarter-wavelength plate 12 to 90° may be provided to control the rotation angle.

According to the configuration of the recording and reproducing apparatus shown in FIG. 7, it is possible to control the rotation of the quarter-wavelength plate 12 at the time of performing a recording operation/a reproducing operation as described with reference to FIGS. 5 and 6. As a result, it is possible to provide a recording and reproducing apparatus that can record only one kind of transmissive hologram at the time of performing a recording operation and that can properly obtain a reproduced beam at the time of performing a reproducing operation.

2-2. Second Technique

A beam applying method as a second technique will be described now.

In the second technique, a hologram recording medium HM2 in which an absorbing linear polarization element 57 is provided instead of the set of the quarter-wavelength pate 52 and the polarizing plate 49.

Figure 9:
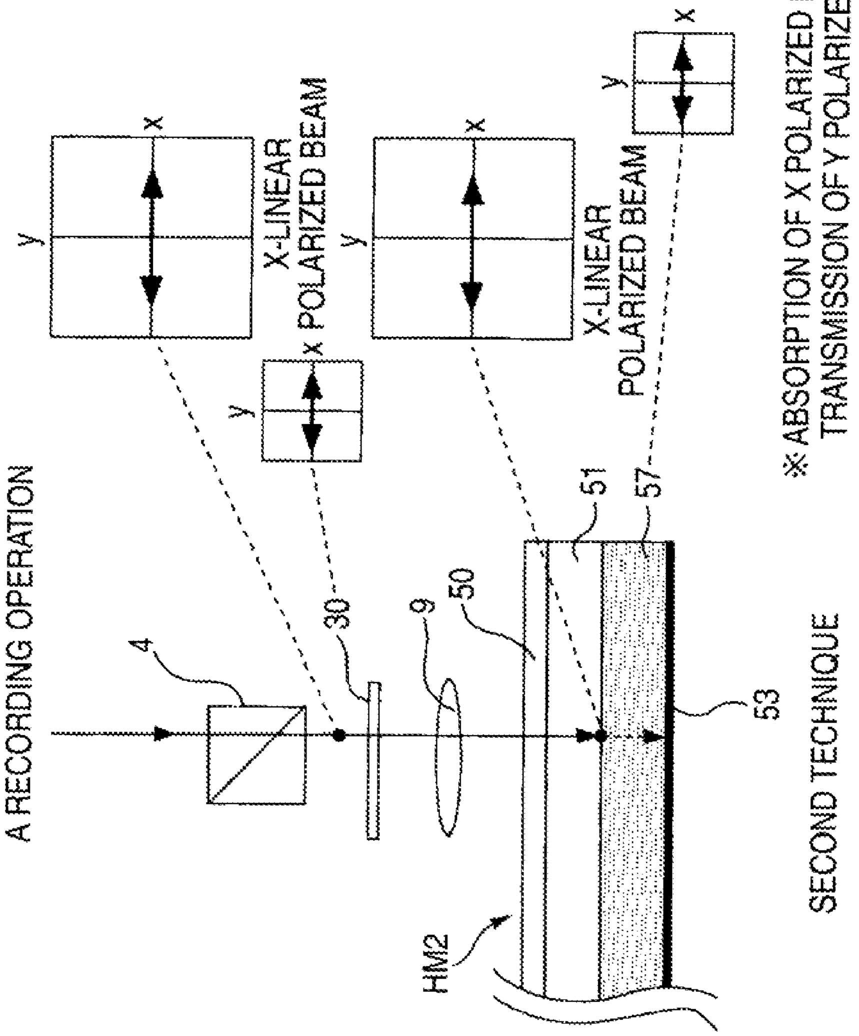
FIG. 9 is a diagram illustrating a second technique of the beam applying method according to the embodiment, where data are recorded.
Figure 10:
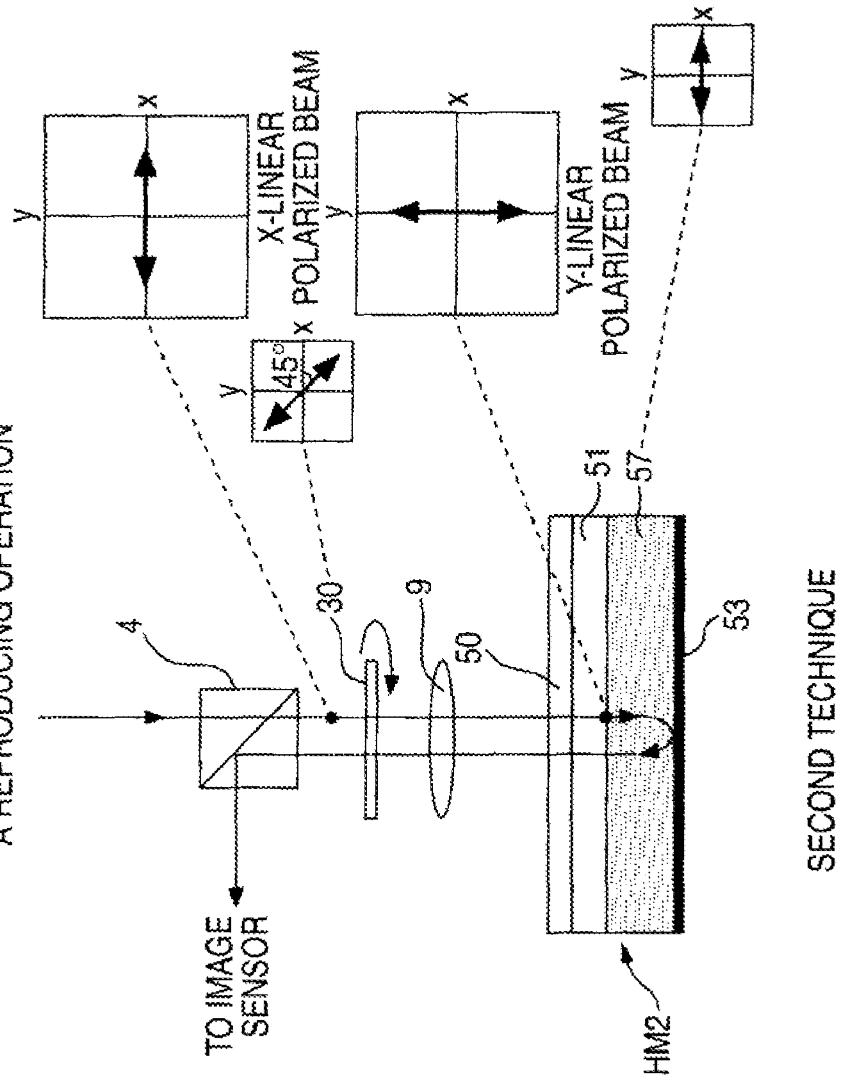
FIG. 10 is a diagram illustrating the second technique of the beam applying method according to the embodiment, where data are reproduced.

FIGS. 9 and 10 are diagrams illustrating the second technique, where the hologram recording medium HM2 (sectional view) used in the second technique, the beam splitter 4, the objective lens 9, the half-wavelength plate 30, and a beam applied to the hologram recording medium HM2 through the beam splitter 4, the half-wavelength plate 30, and the objective lens 9 are schematically shown. FIG. 9 shows a recording operation and FIG. 10 shows a reproducing operation.

In FIGS. 9 and 10, the polarization directions of a beam incident on the half-wavelength plate 30 and a beam incident on the absorbing linear polarization element 57 in the hologram recording medium HM2 are also shown with respect to the X axis and the Y axis perpendicular thereto. In addition, the optical axis direction of the half-wavelength plate 30 and the polarization axis direction of the absorbing linear polarization element 57 are also shown.

In this case, it is assumed that the X-linear polarized beam is incident on the wavelength plate of the apparatus (the half-wavelength plate 30). It is true in the following description that the X-linear polarized beam is incident on the wavelength plate disposed in the apparatus.

As shown in FIGS. 9 and 10, in the hologram recording medium HM2, the cover glass 50, the recording layer 51, the absorbing linear polarization element 57, and the reflecting film 53 are sequentially formed from the uppermost.

The absorbing linear polarization element 57 means a polarization element configured to absorb the incident beam having a polarization direction parallel to the polarization axis direction thereof and to transmit the incident beam having a polarization direction perpendicular to the polarization axis direction thereof. The absorbing linear polarization element 57 has the same characteristic as the polarizing plate 49 used in the first technique and thus may employ a polarizing plate 49.

In the second technique, the optical axis direction of the half-wavelength plate 30 of the apparatus is set to be parallel to the polarization direction (X axis direction in this case) of the incident beam in the recording operation shown in FIG. 9. That is, the X-linear polarized beam is applied to the hologram recording medium HM2 without any change at the time of performing a recording operation.

In the hologram recording medium HM2, the polarization axis direction of the absorbing linear polarization element 57 is parallel to the X axis direction as shown in the figure. The hologram recording medium HM2 is attached to the apparatus so that the polarization axis direction of the absorbing linear polarization element 57 formed therein is parallel to the X axis direction defined in the optical system.

Since the relation between the optical axis direction of the half-wavelength plate 30 and the polarization axis direction of the absorbing linear polarization element 57 is set as described above, the X-linear polarized beam is applied to the hologram recording medium HM2 from the apparatus and the applied X-linear polarized beam is incident on the absorbing linear polarization element 57 of which the polarization axis direction is parallel to the X axis direction through the recording layer 51.

As described above, since the absorbing linear polarization element 57 absorbs an incident beam of which the polarization direction is parallel to the polarization axis direction thereof, the X-linear polarized beam (forward beam) incident on the absorbing linear polarization element 57 is absorbed by the absorbing linear polarization element 57. Accordingly, according to the second technique, it is possible not to generate the reflected beam (that is, backward beam) from the reflecting film 53 and to record only one kind of transmissive hologram at the time of performing a recording operation.

On the other hand, in the reproducing operation shown in FIG. 10, the half-wavelength plate 30 is rotationally driven so that the optical axis direction is inclined by 45° from the state of the recording operation.

By rotationally driving the half-wavelength plate 30, the half-wavelength plate 30 has an angle difference of 45° between the optical axis direction and the polarization direction of the incident beam. As known well, the half-wavelength plate 30 has a characteristic of changing the polarization direction of a linearly-polarized beam of which the polarization direction forms an angle of $\alpha$ along with the optical axis direction by $2\alpha$. Accordingly, the polarization direction of a beam applied to the hologram recording medium HM2 through the rotating half-wavelength plate 30 is changed by 90° as shown in the figure, thereby obtaining a Y-linear polarized beam.

By applying the Y-linear polarized beam to the hologram recording medium HM2, a linearly-polarized beam having a polarization direction perpendicular to the polarization axis direction is incident on the absorbing linear polarization element 57 and thus the absorbing linear polarization element 57 transmits the incident beam. Accordingly, as shown in the figure, the beam reaches the reflecting film 53 at the time of performing a reproducing operation, thereby obtaining the reflected beam (backward beam) from the hologram recording medium HM2.

In the second technique, the half-wavelength plate 30 disposed in the apparatus is driven so that an angle difference of 45° is given to the optical axis in the recording operation and the reproducing operation. Accordingly, the linearly-polarized beams of which the polarization directions are perpendicular to each other can be applied to the hologram recording medium HM2 in the recording operation and the reproducing operation. As a result, depending on the characteristics of the absorbing linear polarization element 57 formed in the hologram recording medium HM2, the beam applied to the medium is absorbed by the absorbing linear polarization element 57 in the recording operation and the applied beam is transmitted by the absorbing linear polarization element 57 in the reproducing operation to obtain the reflected beam (backward beam) from the reflecting film 53. According to the second technique, it is possible not to generate the backward beam and to record only one kind of transmissive hologram at the time of performing a recording operation. In addition, it is possible to properly obtain the reproduced beam at the time of performing a reproducing operation.

In the second technique, the hologram recording medium HM2 in which the recording layer 51, the absorbing linear polarization element 57, and the reflecting film 53 are sequentially formed from the uppermost is used. According to the hologram recording medium HM2, the linearly-polarized beam (for example, X-linear polarized beam) of which the polarization direction is parallel to the polarization axis direction of the absorbing linear polarization element 57 is applied to the hologram recording medium HM2 at the time of performing a recording operation and the linearly-polarized beam (for example, Y-linear polarized beam) of which the polarization direction is perpendicular to the polarization axis direction of the absorbing linear polarization element 57 is applied thereto at the time of performing a reproducing operation. Accordingly, it is possible to record only one kind of transmissive hologram in the recording operation and to properly obtain the reproduced beam in the reproduction operation. Therefor, according to the hologram recording medium HM2, it is possible to provide an optical recording medium that can record only one kind of transmissive hologram in the recording operation and that can obtain the reproduced beam in the reproducing operation, so as to cope with the recording and reproducing apparatus.

For the purpose of convenient explanation, the structure of the hologram recording medium HM2 is schematically shown in FIGS. 9 and 10. Actually, information for controlling the recording and reproducing positions is particularly recorded in the hologram recording medium HM2 used in the second technique.

Figure 11:
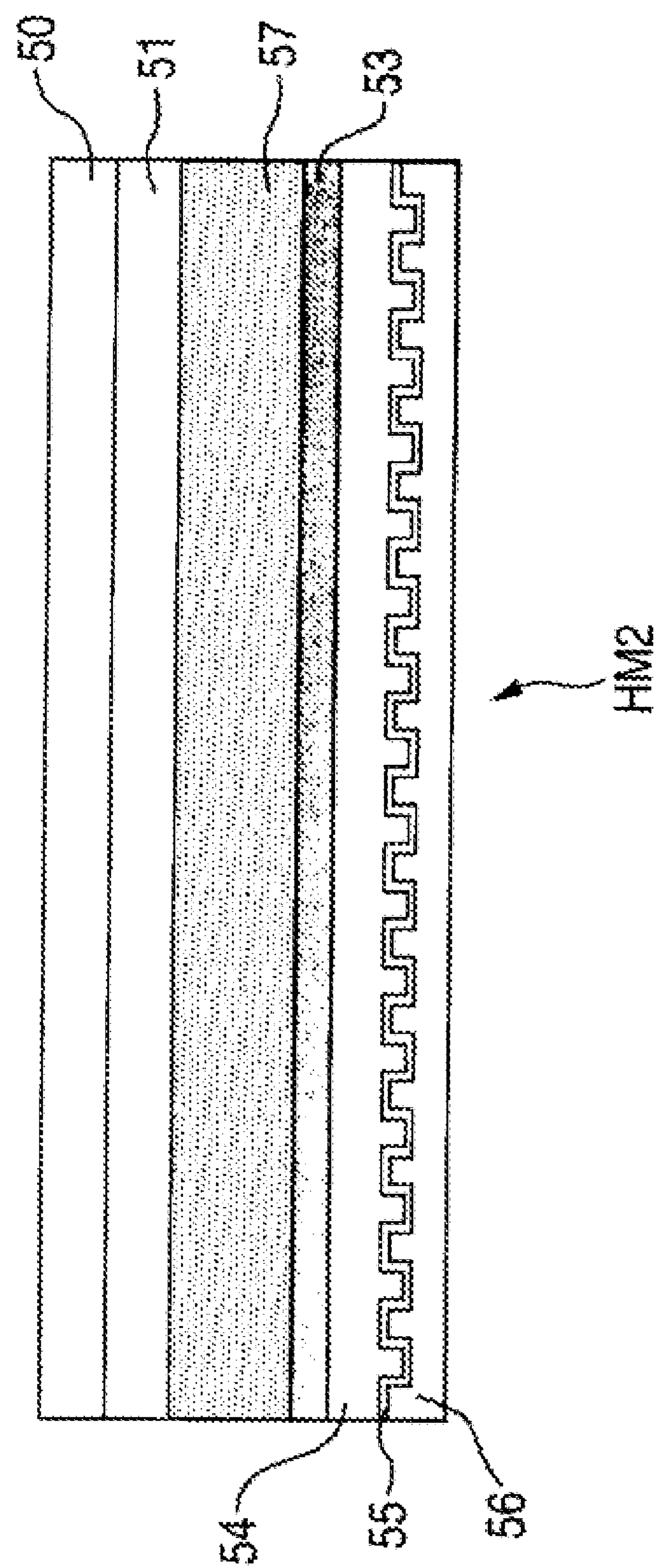
FIG. 11 is a diagram illustrating a sectional structure of a hologram recording medium used in the second technique.

FIG. 11 is a diagram illustrating a sectional structure of the hologram recording medium HM2.

As shown in the figure, in the actual structure of the hologram recording medium HM2, the absorbing linear polarization element 57 is formed instead of the set of the quarter-wavelength plate 52 and the polarizing plate 49 in the hologram recording medium HM1 shown in FIG. 8.

In this case, in order to control the recording and reproducing position, the absorbing linear polarization element 57 should have the wavelength selectivity.

The recording and reproducing apparatus for implementing the second technique to correspond to the hologram recording medium HM2 has substantially the same configuration as shown in FIG. 7.

However, in the second technique, the quarter-wavelength plate 12 in FIG. 7 is replaced with the half-wavelength plate 30. As described above, since the angle difference between the recording operation and the reproducing operation is not 90° but 45° in the second technique, the recording and reproducing apparatus is constructed such that the half-wavelength plate 30 is driven with the angle difference of 45° in the optical axis between the recording operation and the reproducing operation under the rotation control of the wavelength plate rotation control unit 22.

A specific method for obtaining an appropriate angel relation between the recording operation and the reproducing operation is based on the description of the first technique. That is, the relation between the recognized state of the rotation angle of the motor in the rotational driving unit 21 recognized by the wavelength plate rotation control unit 22 and the attachment angle of the wavelength plate to the rotational driving unit 21 may be adjusted, or the rotation angle may be controlled by providing a physical stopper for restricting the rotation angle of the wavelength plate to a predetermined angle range.

2-3. Third Technique

In a third technique, the reflecting film 53 reflecting a beam passing through the polarization element is omitted from the hologram recording medium HM and a hologram recording medium HM3 in which a reflecting linear polarization element 58 having a function of reflecting an incident beam is formed is used.

Figure 12:
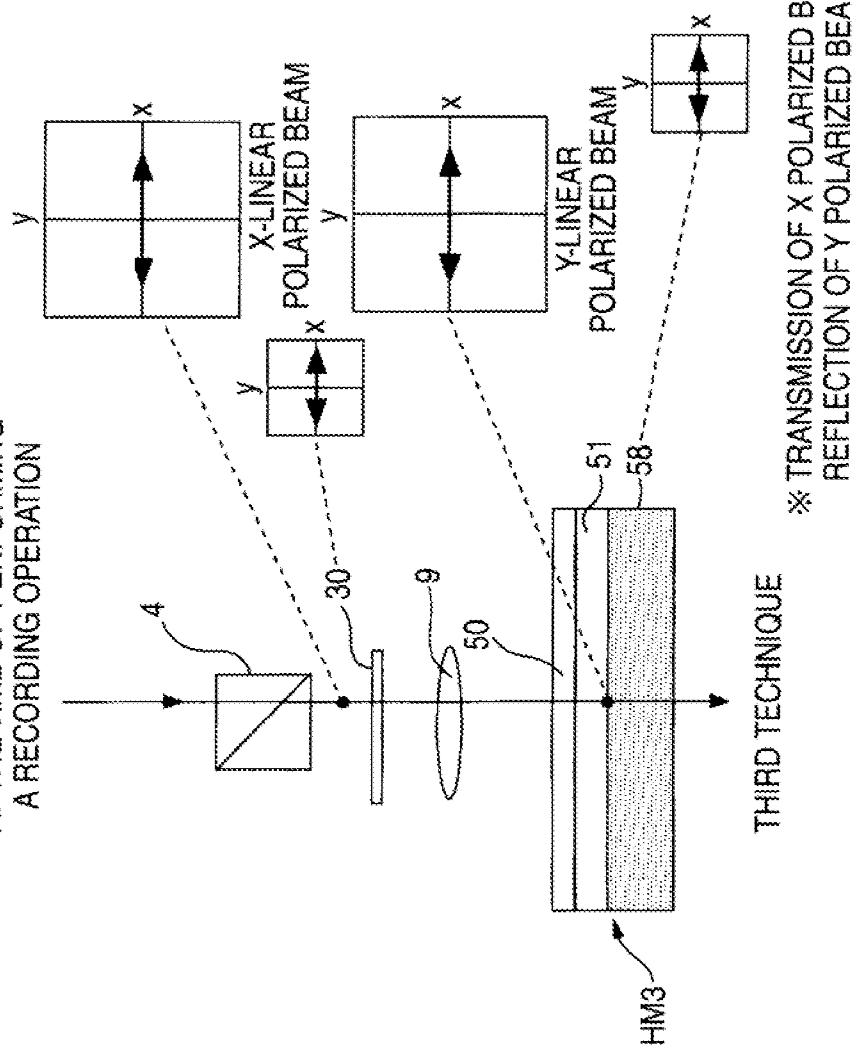
FIG. 12 is a diagram illustrating a third technique of the beam applying method according to the embodiment, where data are recorded.
Figure 13:
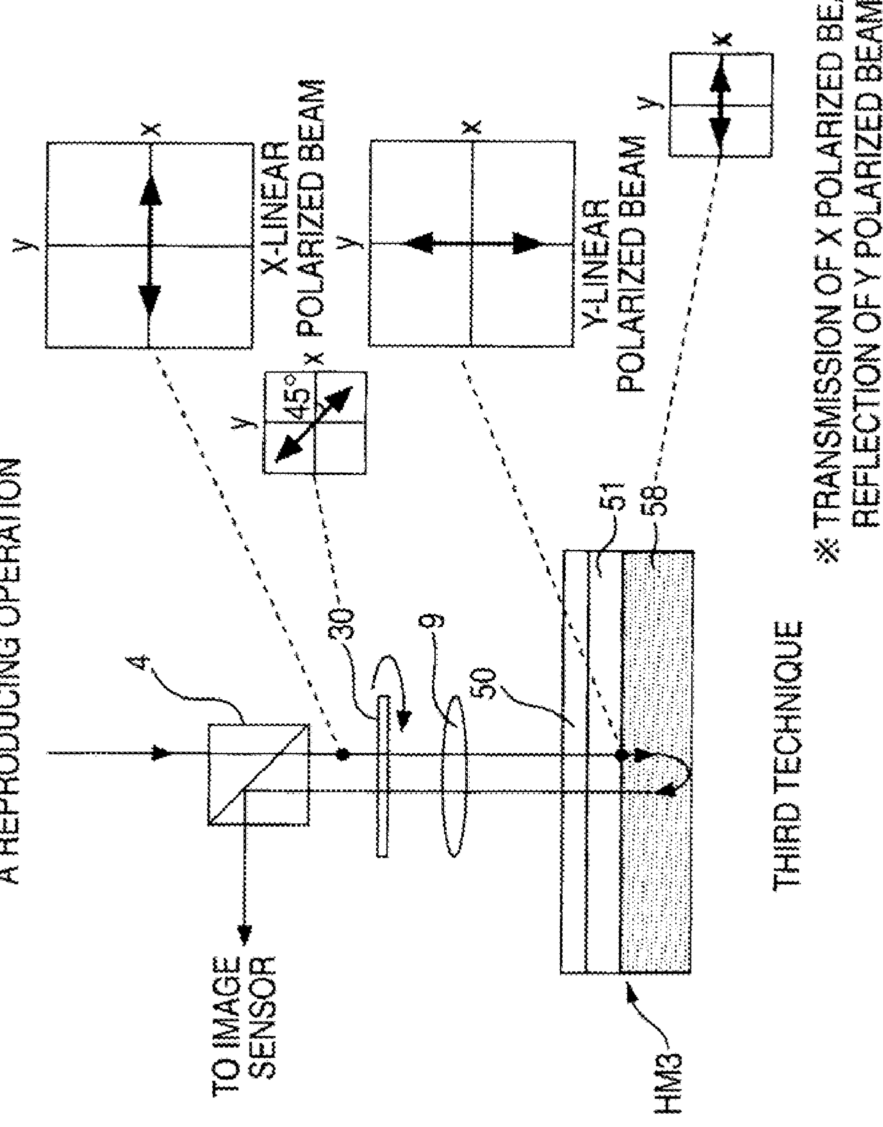
FIG. 13 is a diagram illustrating the third technique of the beam applying method according to the embodiment, where data are reproduced.

FIGS. 12 and 13 are diagrams illustrating the third technique, where FIG. 12 shows a recording operation and FIG. 13 shows a reproducing operation.

In FIGS. 12 and 13, the hologram recording medium HM3 (sectional view), the beam splitter 4, the objective lens 9, the half-wavelength plate 30, and a beam applied to the hologram recording medium HM3 through the beam splitter 4, the half-wavelength plate 30, and the objective lens 9 are schematically shown.

In FIGS. 12 and 13, the polarization directions of a beam incident on the half-wavelength plate 30 and a beam incident on the recording layer 51 in the hologram recording medium HM3, the optical axis direction of the half-wavelength plate 30, and the polarization axis direction of the reflecting linear polarization element 58 disposed in the hologram recording medium HM3 are also shown with respect to the X axis and the Y axis perpendicular thereto.

As shown in FIGS. 12 and 13, in the hologram recording medium HM3 the cover glass 50 and the recording layer 51 are sequentially formed from the uppermost and the reflecting linear polarization element 58 is formed as a lower layer thereof.

The reflecting linear polarization element 58 means a polarization element configured to transmit an incident beam having a polarization direction parallel to the polarization axis direction thereof and to reflect an incident beam having a polarization direction perpendicular to the polarization axis direction thereof. The reflecting linear polarization element 58 can be made of, for example, photonic crystals.

In the recording operation shown in FIG. 12, according to the third technique, the optical axis direction of the half-wavelength plate 30 of the apparatus side is parallel to the polarization direction of the incident beam. That is, the optical axis direction of the half-wavelength plate 30 is parallel to the X axis direction to correspond to the input X-linear polarized beam. Accordingly, in the recording operation, the X-linear polarized beam is applied to the hologram recording medium HM3 without any change.

In this case, the hologram recording medium HM3 is attached to the apparatus so that the polarization axis direction of the reflecting linear polarization element 58 is parallel to the X axis direction as shown in the figure.

Since the optical axis direction of the half-wavelength plate 30 and the polarization axis of the reflecting linear polarization element 58 are set as described above, the X-linear polarized beam is applied to the hologram recording medium HM3 from the apparatus in the recording operation. The applied X-linear polarized beam is incident on the reflecting linear polarization element 58, the polarization axis direction of which is the X axis direction, through the recording layer 51.

As described above, since the reflecting linear polarization element 58 serves to transmit the incident beam of which the polarization direction is parallel to the polarization axis direction thereof, the X-linear polarized beam (forward beam) incident on the reflecting linear polarization element 58 is output through the reflecting linear polarization element 58.

Here, it is assumed in the hologram recording medium HM3 that the reflecting film 53 is not formed below the reflecting linear polarization element 58. Accordingly, since the forward beam is output through the reflecting linear polarization element 58, the forward beam is output through the entire hologram recording medium HM3. The third technique prevents the backward beam from being generated by the use of the above-mentioned structure.

As shown in FIG. 13, the half-wavelength plate 30 of the apparatus is rotationally driven so that the optical axis direction is inclined by 45° about that of the recording operation at the time of performing a reproducing operation.

By rotationally driving the half-wavelength plate 30, the polarization direction of the beam applied to the hologram recording medium HM3 through the half-wavelength plate 30 is changed by 90° as shown in the figure into the Y-linear polarized beam. Since the linearly-polarized beam having a polarization direction perpendicular to the polarization axis direction thereof is incident on the reflecting linear polarization element 58 by applying the Y-linear polarized beam to the hologram recording medium HM3, the reflecting linear polarization element 58 serves to reflect the incident beam. That is, in the third technique, a reflected beam is output from the reflecting linear polarization element 58 in the reproducing operation, thereby obtaining the backward beam.

In the third technique, the half-wavelength plate 30 disposed in the apparatus is driven so that the angle difference of 45° is given to the optical axis in the recording operation and the reproducing operation. Accordingly, the linearly-polarized beams of which the polarization directions are perpendicular to each other can be applied to the hologram recording medium HM3 in the recording operation and the reproducing operation, respectively. As a result, depending on the characteristics of the reflecting linear polarization element 58 formed in the hologram recording medium HM3, the beam applied to the medium is transmitted by the reflecting linear polarization element 58 in the recording operation and the applied beam is reflected by the reflecting linear polarization element 58 in the reproducing operation, thereby obtaining the backward beam. Therefore, according to the third technique, it is possible not to generate the backward beam but to record only one kind of transmissive hologram in the recording operation and to properly obtain the reproduced beam in the reproducing operation.

In the third technique, the hologram recording medium HM3 in which the recording layer 51 and the reflecting linear polarization element 58 are sequentially formed from the uppermost is used. According to the hologram recording medium HM3, a linearly-polarized beam (for example, X-linear polarized beam) having a polarization direction parallel to the polarization axis direction of the reflecting linear polarization element 58 is app HM3 from the apparatus in the recording operation and a linearly-polarized beam (for example, Y-linear polarized beam) having a polarization direction perpendicular to the polarization axis direction of the reflecting linear polarization element 58 is applied thereto in the reproducing operation. Accordingly, it is possible to record only one kind of transmissive hologram in the recording operation and to properly obtain the reproduced beam in the reproducing operation. Therefore, according to the hologram recording medium HM3, it is possible to provide an optical recording medium that can record only one kind of transmissive hologram in the recording operation and that can obtain the reproduced beam in the reproducing operation so as to correspond to the recording and reproducing apparatus having the above-mentioned configuration.

For the purpose of convenient explanation, the structure of the hologram recording medium HM3 is schematically shown in FIGS. 12 and 13. Information for controlling the recording and reproducing positions may be recorded particularly in the hologram recording medium HM3 used in the third technique.

Figure 14:
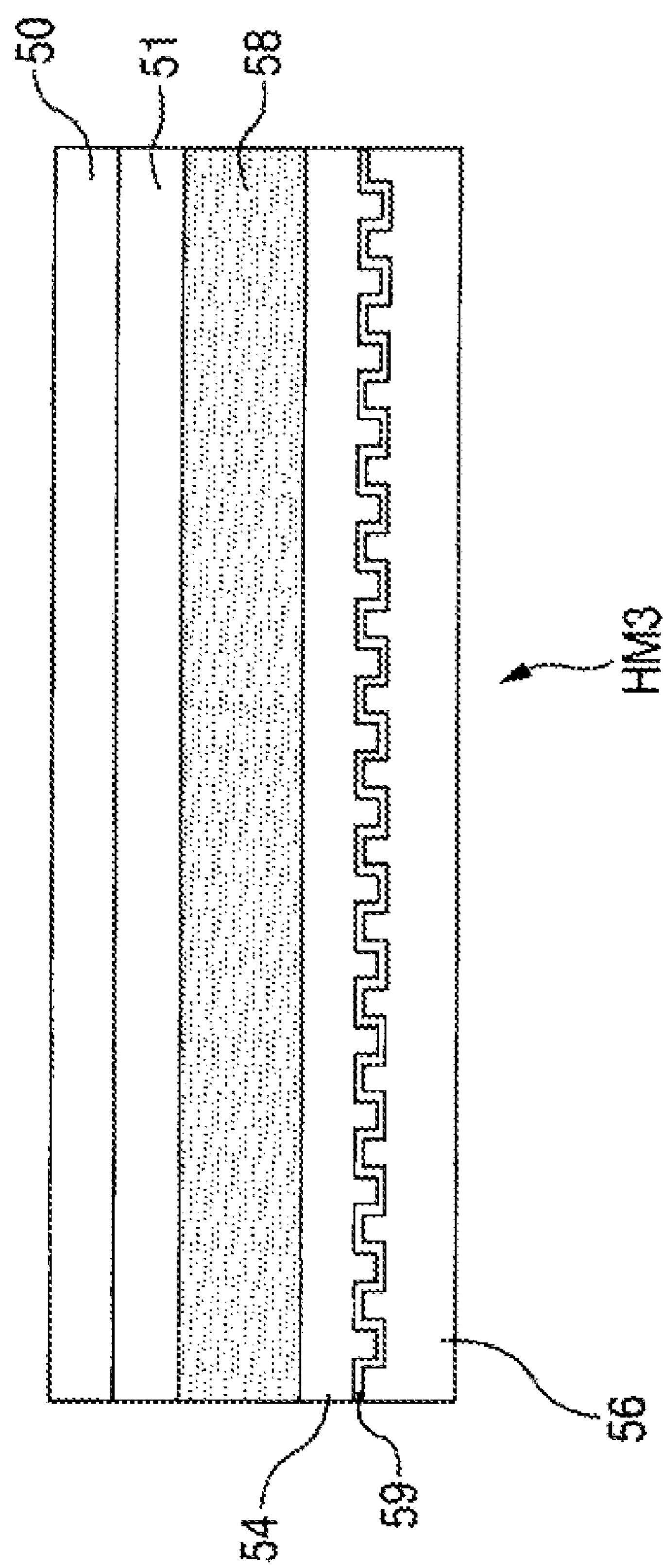
FIG. 14 is a diagram illustrating a sectional structure of a hologram recording medium used in the third technique.

FIG. 14 is a diagram illustrating a sectional structure of the hologram recording medium HM3.

As shown in the figure, in the actual structure of the hologram recording medium HM3, the reflecting linear polarization element 58 is formed instead of the absorbing linear polarization element 57 in the hologram recording medium HM2 used in the second technique and shown in FIG. 11 and the reflecting film 53 is omitted.

As described above, since the incident beam is reflected by the reflecting linear polarization element 58 in the reproducing operation, the beam of which the light source is the second laser 15 does not reach the pitted surface, thereby not controlling the recording and reproducing positions. Therefore, the reflecting linear polarization element 58 should have the wavelength selectivity.

In the hologram recording medium HM3, a reflecting film 59 having the wavelength selectivity instead of the reflecting film 55 is formed as the reflecting film on the pitted surface of the substrate 56. That is, the reflecting film is configured to reflect only the laser beam having a wavelength of 650 nm of which the light source is the second laser 15 and to transmit the laser beam having a wavelength of 410 nm of which the light source is the first laser 1.

As described above, in the third technique, the backward beam is not generated by allowing the beam applied to the medium to pass through the entire medium at the time of performing a recording operation. Similarly to the above-mentioned techniques, when the reflecting film 55 not having the wavelength selectivity is formed as the reflecting film on the pitted surface, the beam passing through the reflecting linear polarization element 58 is reflected by the reflecting film 55, thereby not preventing the backward beam from being generated. Accordingly, the reflecting film 59 having the wavelength selectivity should be used as the reflecting film on the pitted surface in the third technique.

In the recording and reproducing apparatus for implementing the third technique to correspond to the hologram recording medium HM3, similarly to the second technique, the quarter-wavelength plate 12 shown in FIG. 7 is replaced with the half-wavelength plate 30 and the half-wavelength 30 is driven under the rotation control of the wavelength plate rotation control unit 22 so that the angle difference of 45° is given to the optical axis in the recording operation and the reproducing operation.

2-4. Modified Example of Second Technique

It has been assumed that the recording and reproducing position on the medium is moved by allowing the recording and reproducing apparatus to slidably drive the hologram recording medium HM. Instead, the recording and reproducing position may be sequentially moved by rotationally driving the medium, similarly to a CD or a DVD.

However, when the hologram recording medium HM is rotationally driven, the relation between the polarization direction of the beam applied to the hologram recording medium HM and the polarization axis direction of the polarization element of the medium is not fixed unlike the above description, thereby not obtaining the same advantages.

Therefore, this embodiment suggests a recording and reproducing method that can record only one kind of transmissive hologram even when the hologram recording medium HM is rotationally driven.

A technique for coping with the rotation of the hologram recording medium HM in the second technique will be described first as a modified example of the second technique.

Figure 15:
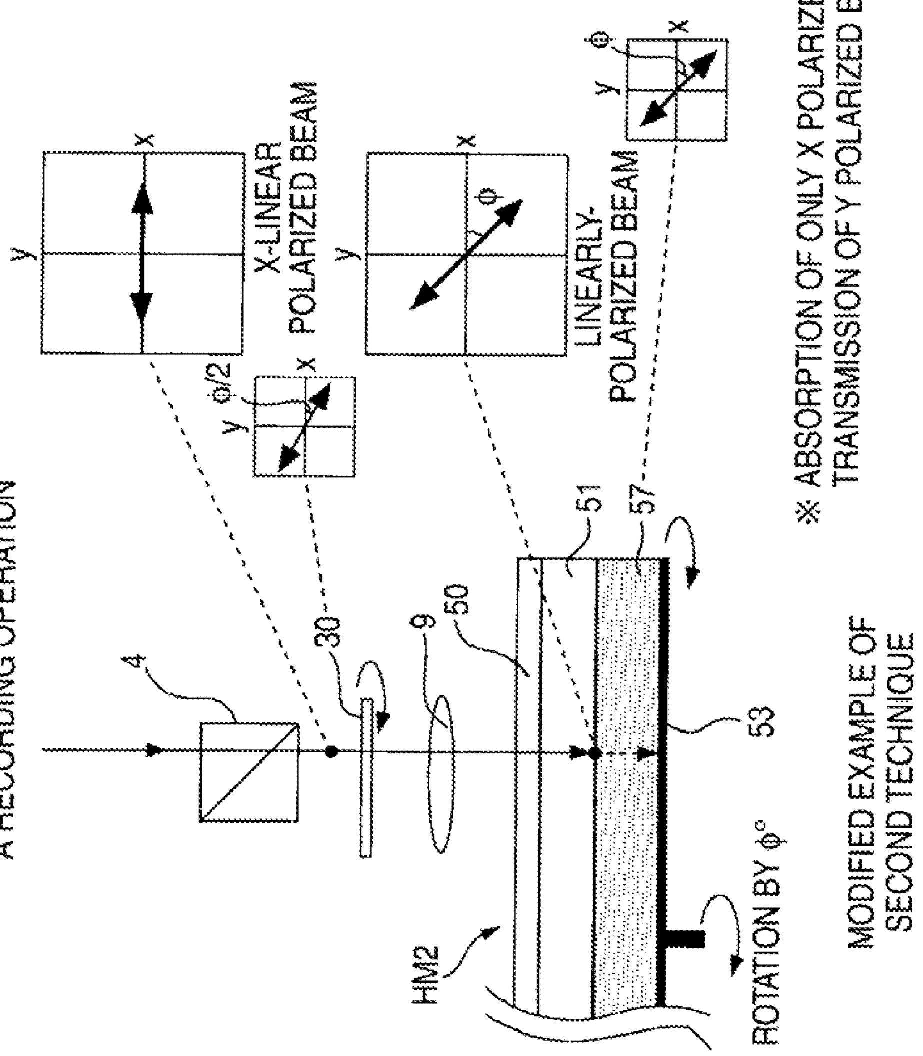
FIG. 15 is a diagram illustrating a modified example of the second technique, where data area recorded.
Figure 16:
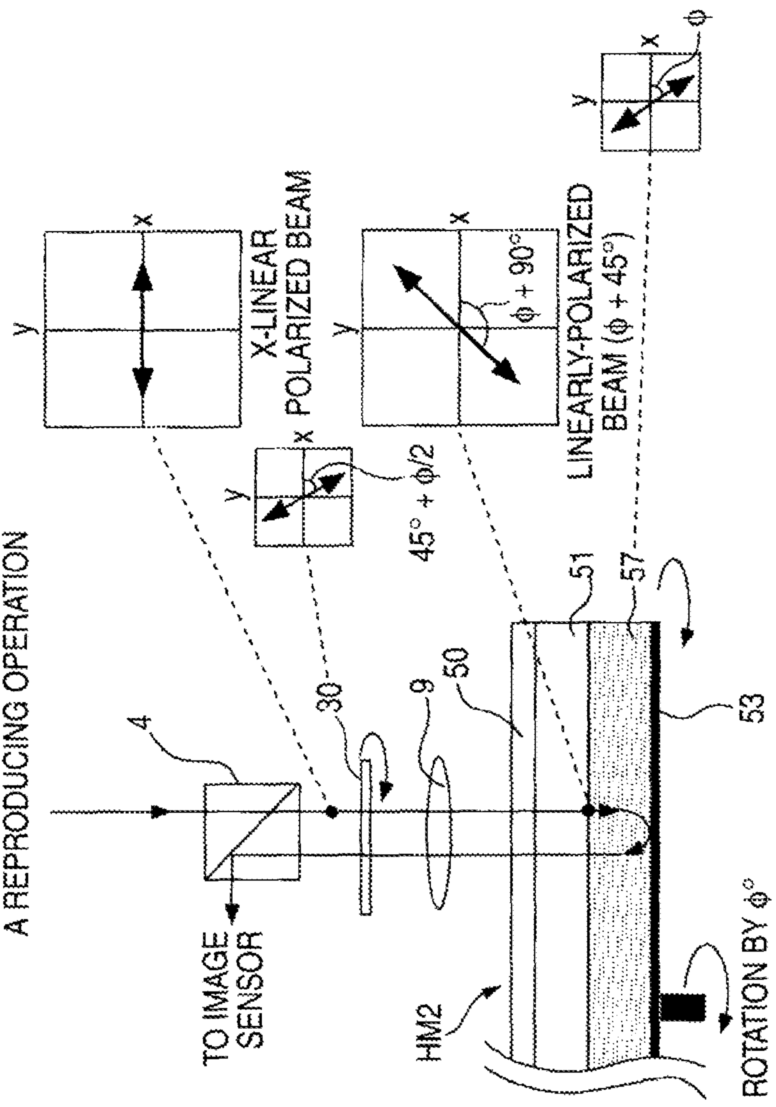
FIG. 16 is a diagram illustrating the modified example of the second technique, where data area reproduced.

FIGS. 15 and 16 are diagrams illustrating the modified example of the second technique, where FIG. 15 shows a recording operation and FIG. 16 shows a reproducing operation.

In FIGS. 15 and 16, the hologram recording medium HM2 (sectional view), the beam splitter 4 disposed in the apparatus, the objective lens 9, the half-wavelength plate 30, and the beam applied to the hologram recording medium HM2 through the beam splitter 4, the half-wavelength plate 30, and the objective lens 9 are schematically shown, similarly to FIGS. 9 and 10.

The polarization directions of the beam incident on the half-wavelength plate 30 and the beam incident on the absorbing linear polarization element 57 in the hologram recording medium HM2 are shown with respect to the X axis and the Y axis perpendicular thereto. In addition, the optical axis direction of the half-wavelength plate 30 and the polarization axis direction of the absorbing linear polarization element 57 are also shown.

Since the modified example of the second technique is based on the second technique, the elements described in the second technique are denoted by like reference numerals and description thereof is omitted.

In the recording operation shown in FIG. 15 and the reproducing operation shown in FIG. 16, the hologram recording medium HM2 is rotated by φ° from the rotation angle of 0° (where the medium rotation angle is 0°). In this case, the state where the medium rotation angle is 0° is shown in FIGS. 9 and 10. In this state, the polarization axis direction of the absorbing linear polarization element 57 formed in the hologram recording medium HM2 is parallel to the polarization direction (that is, X axis direction in this case) of a beam incident on the half-wavelength plate 30 of the apparatus.

As can be understood from the description with reference to FIG. 9, in the hologram recording medium HM2 of which the medium rotation angle is 0° and which is used in the second technique, the polarization direction of the transmitted beam can be set to be parallel to the polarization axis direction of the absorbing linear polarization element 57 formed in the hologram recording medium HM2 at the time of performing a recording operation by setting the optical axis direction of the half-wavelength plate 30 to be parallel to the polarization direction (the X axis direction in this case) of the incident beam. Accordingly, it is possible to allow the absorbing linear polarization element 57 to absorb the applied beam, thereby preventing the backward beam from being generated.

As shown in FIG. 15, when the hologram recording medium HM2 is rotationally driven, the polarization axis of the absorbing linear polarization element 57 disposed in the medium is rotated by the same angle. Accordingly, in order not to generate the backward beam when the medium is rotationally driven, the polarization direction of the beam incident on the absorbing linear polarization element 57 can be made to rotate by following the polarization axis of the rotating absorbing linear polarization element 57. That is, by rotating the half-wavelength plate 30 of the apparatus, the polarization direction of the beam incident on the absorbing linear polarization element 57 can be rotated with the rotation of the hologram recording medium HM2.

Accordingly, in the modified example of the second technique, in the recording operation shown in FIG. 15, the half-wavelength 30 is rotationally driven by φ/2, as shown in the figure, with the rotation of the hologram recording medium HM2 by φ. In this case, when it is assumed that the rotation angle of the half-wavelength plate 30 is θ and the rotation angle of the hologram recording medium HM2 is φ, the half-wavelength plate 30 can be rotationally driven to maintain the relation of "θ=φ/2".

As described above, the half-wavelength plate 30 has a characteristic of changing the polarization direction of the incident beam by double the angle formed by the polarization direction of the incident beam and the optical axis direction. Accordingly, by rotating the half-wavelength plate 30 by φ/2, as shown in the figure, the polarization direction of the beam incident on the absorbing linear polarization element 57 of the hologram recording medium HM2 can be rotated by φ. That is, in order to correspond to the rotation of the hologram recording medium HM2 by φ, the polarization direction of the beam incident on the absorbing linear polarization element 57 can be rotated by φ.

By rotationally driving the half-wavelength plate 30 with the rotation of the hologram recording medium HM2, the reflected beam (backward beam) from the hologram recording medium HM2 may not be generated in the recording operation even when the hologram recording medium HM2 is rotationally driven.

On the other hand, in the reproducing operation shown in FIG. 16, when it is assumed that the rotation angle of the half-wavelength plate 30 is θ and the rotation angle of the hologram recording medium HM2 is φ, the half-wavelength plate 30 can be rotationally driven to maintain the relation of "θ=45+φ/2".

As described with reference to FIG. 10, by rotating the half-wavelength plate 30 by 45° from the state of the recording operation at the time of performing a reproducing operation, the polarization direction of the beam incident on the absorbing linear polarization element 57 can be made to be perpendicular to that of the recording operation so as to generate the backward beam. Accordingly, with the rotation of the hologram recoding medium HM2, the half-wavelength plate 30 is rotationally driven so that the relation of "θ=φ/2" described with reference to FIG. 15 is maintained with respect to the state where it is inclined by 45°.

By rotationally driving the half-wavelength plate 30 so as to maintain the relation of "θ=45+φ/2", the polarization direction of the beam incident on the absorbing linear polarization element 57 in the reproducing operation can be set to φ+90°. Accordingly, a beam having a polarization direction always perpendicular to the polarization axis of the absorbing linear polarization element 57 rotated by φ° with the rotation by φ° can be applied. Accordingly, at the time of performing a reproducing operation, by allowing the absorbing linear polarization element 57 to transmit the incident beam, it is possible to obtain the reflected beam (backward beam) from the reflecting film 53.

In the modified example of the second technique, the half-wavelength plate 30 disposed in the apparatus is driven to rotate with the rotation of the hologram recording medium HM2 in the recording operation and the reproducing operation while the optical axis maintains the angle difference of 45° between the recording operation and the reproducing operation. Accordingly, even when the hologram recording medium HM2 is rotationally driven, the linearly-polarized beams of which polarization directions are perpendicular to each other are applied to the hologram recording medium HM2 in the recording operation and the reproducing operation, respectively. As a result, depending on the characteristics of the absorbing linear polarization element 57 formed in the hologram recording medium HM2, the beam applied to the medium is absorbed by the absorbing linear polarization element 57 in the recording operation and the applied beam is transmitted by the absorbing linear polarization element 57 in the reproducing operation, thereby obtaining the reflected beam (backward beam) from the reflecting film 53. Accordingly, even when the hologram recording medium HM2 is rotationally driven, it is possible to record only one kind of transmissive hologram without generating the backward beam in the recording operation and to properly obtain the reproduced beam in the reproducing operation.

As can be understood from the above description, in order to implement the modified example of the second technique, it is necessary to rotationally drive the half-wavelength plate 30 so as to follow the rotation of the hologram recording medium HM2.

Specifically, the rotation angle information is recorded in the hologram recording medium HM2. That is, on the pitted surface on the substrate 56 shown in FIG. 11 in the hologram recording medium HM2, values of unit rotation angles of the hologram recording medium HM2 having a disk shape are recorded as the "rotation angle information."

That is, by recording the values of the unit rotation angles on the medium for each unit rotation angle and allowing the apparatus to read the values, it is possible to confirm the medium rotation angle at a sight.

It should be noted that the absorbing linear polarization element 57 of the hologram recording medium HM2 is formed so that the angle of the optical axis direction about the axis direction in which the rotation angle defined by the recorded rotation angle information is 0° is 0° (parallel to each other). That is, by forming the absorbing linear polarization element 57 in the hologram recording medium HM2, it is guaranteed that the optical axis direction of the absorbing linear polarization element 57 and the axis direction in which the rotation angle is 0° are parallel to each other when the rotation angle of the hologram recording medium HM2 is 0° (that is, when 0° is read as the rotation angle information).

To correspond to the hologram recording medium HM2 on which the rotation angle information is recorded, a configuration of the recording and reproducing apparatus for implementing the modified example of the second technique will be described with reference to FIG. 17.

Figure 17:
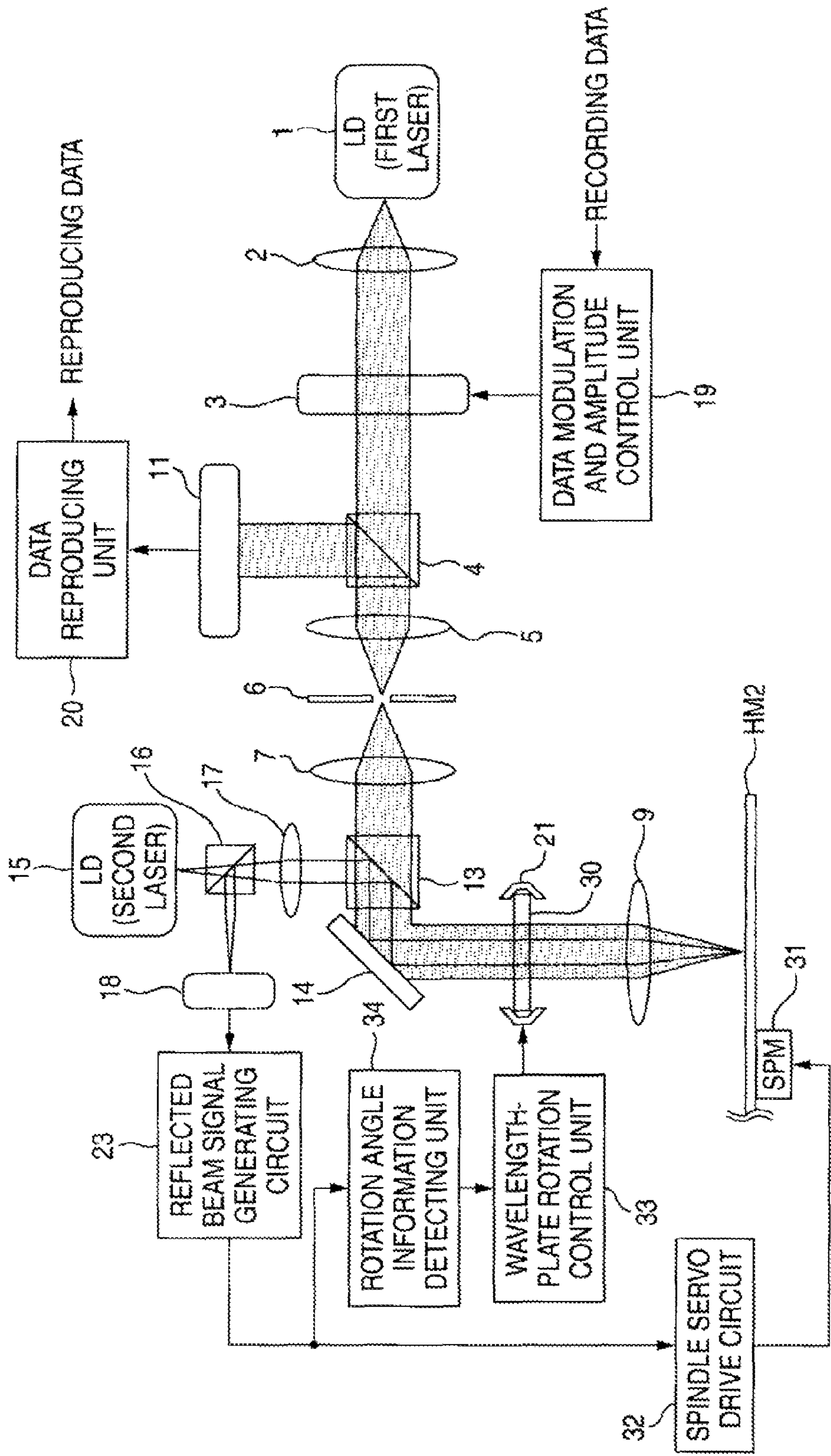
FIG. 17 is a diagram illustrating an internal configuration of a recording and reproducing apparatus for embodying the modified example of the second technique (and a modified example of a third technique).

In FIG. 17, the elements described above are denoted by like reference numerals and description thereof is omitted.

In the recording and reproducing apparatus shown in FIG. 17, the slide mechanism 25 and the access control and slide driving unit 24 disposed in the recording and reproducing apparatus shown in FIG. 7 are omitted and the spindle motor (SPM) 31 and the spindle servo drive circuit 32 are provided as shown in the figure.

A rotation angle information detecting unit 34 is added as a configuration for detecting the rotation angle information recorded in the hologram recording medium HM2.

In the recording and reproducing apparatus shown in FIG. 17, in order to read the rotation angle information recorded on the hologram recording medium HM2, the reflected beam signal generating circuit 23 generates an RF signal on the basis of an electrical signal from the photo detector 18. The rotation angle information detecting unit 34 detects the rotation angle information on the basis of the RF signal generated by the reflected beam signal generating circuit 23.

Like the modified example of the second technique, when the hologram recording medium HM2 is rotationally driven, the recording and reproducing apparatus performs a variety of servo control operations such as tracking servo for following a pitted line formed on the pitted surface of the substrate 56. With this control, the reflected beam signal generating circuit 23 generates signals for a variety of servo (for example, a tracking error signal or a focus error signal).

Although not shown in the figure, the reflected beam signals for a variety of servo generated from the reflected beam signal generating circuit 23 are supplied to a servo-based circuit not shown and positions in the tracking direction and the focus direction of the objective lens 9 are controlled accordingly, thereby implementing a variety of servo control.

The spindle motor 31 rotationally drives the hologram recording medium HM2 set at a predetermined position. The spindle servo drive circuit 32 controls the rotational drive of the spindle motor 31, for example, by the use of a predetermined rotation control method such as a CLV.

In this case, the spindle servo drive circuit 32 receives the RF signal (a reading signal for reading a signal recorded on the substrate 56 of the hologram recording medium HM2) generated from the reflected beam signal generating circuit 23, performs a PLL process to generate a reproduction clock, and acquires the reproduction clock as the rotation speed information of the spindle motor 31. The spindle servo control circuit controls the rotation of the spindle motor 31 on the basis of the rotation speed information, so that the hologram recording medium HM2 is rotationally driven by the use of the predetermined rotational driving method.

In the recording and reproducing apparatus shown in FIG. 17, the rotational driving unit 21 and the wavelength plate rotation control unit 33 are provided as the configuration for rotationally driving the half-wavelength plate 30.

First, the rotational driving unit 21 is configured to hold the half-wavelength plate 30 with the half-wavelength plate 30 interposed between the mirror 14 and the objective lens 9 in the optical path and to rotationally drive the held half-wavelength plate 30. That is, the rotational driving unit 21 is the same as described with reference to FIG. 7, except that the wavelength plate is changed from the quarter-wavelength plate 12 to the half-wavelength plate 30.

The wavelength plate rotation control unit 33 receives the rotation angle information detected by the rotation angle information detecting unit 34 and controls the rotation of the motor of the rotational driving unit 21 on the basis of the received value, so that the half-wavelength plate 30 is rotated with the rotation of the hologram recording medium HM2.

Specifically, when it is assumed that the rotation angle of the half-wavelength plate 30 is $\theta$ and the rotation angle of the hologram recording medium HM2 is $\phi$, the wavelength plate rotation control unit controls the rotation of the motor of the rotational driving unit 21 so as to maintain the relation of "$\theta=\phi/2$" described with reference to FIG. 15 at the time of performing a recording operation. At the time of performing a reproducing operation, the wavelength plate rotation control unit controls the rotation of the motor of the rotational driving unit 21 so as to maintain the relation of "$\theta=45+\phi/2$" described with reference to FIG. 16.

As describe above, in the modified example of the second technique, it is assumed that the optical axis direction of the half-wavelength plate 30 is parallel to the polarization direction of the beam incident on the half-wavelength plate 30 when the rotational angel of the half-wavelength plate 30 is 0°.

Accordingly, in order to establish the modified example of the second technique, the optical axis direction of the half-wavelength plate 30 should be parallel to the polarization direction of the beam incident on the half-wavelength plate 30 when the rotation angle of the half-wavelength plate 30 is 0° which is used as a reference by the wavelength plate rotation control unit 33. That is, the relation between the recognized state of the rotation angel (the rotation angle of the motor of the rotational driving unit 21) of the half-wavelength plate 30 recognized by the wavelength plate rotation control unit 33 and the attachment angle of the half-wavelength plate 30 to the rotational driving unit 21 is adjusted so that the optical axis direction of the half-wavelength plate 30 is parallel to the polarization direction of the beam incident on the half-wavelength plate 30 when it is recognized by the wavelength plate rotation control unit 33 that the rotation angle of the half-wavelength plate 30 is 0°

By trying this adjustment, the polarization direction of the beam incident on the hologram recording medium HM2 can be changed from 0° to φ° with the rotation of the hologram recording medium HM2 form 0° to φ°.

According to the configuration of the recoding and reproducing apparatus shown in FIG. 17, it is possible to rotationally drive the half-wavelength plate 30 with the rotation of the hologram recording medium HM2 in the recoding operation and the reproducing operation while the optical axis direction maintains the angle difference of 45° between the recoding operation and the reproducing operation. Accordingly, according to the modified example of the second technique, it is possible to provide a recording and reproducing apparatus that can record only one kind of transmissive hologram at the time of performing a recording operation and that can properly obtain a reproduced beam.

2-5. Modified Example of Third Technique

The modified example of the third technique is to cope with the rotation of the hologram recording medium HM on the basis of the third technique.

Figure 18:
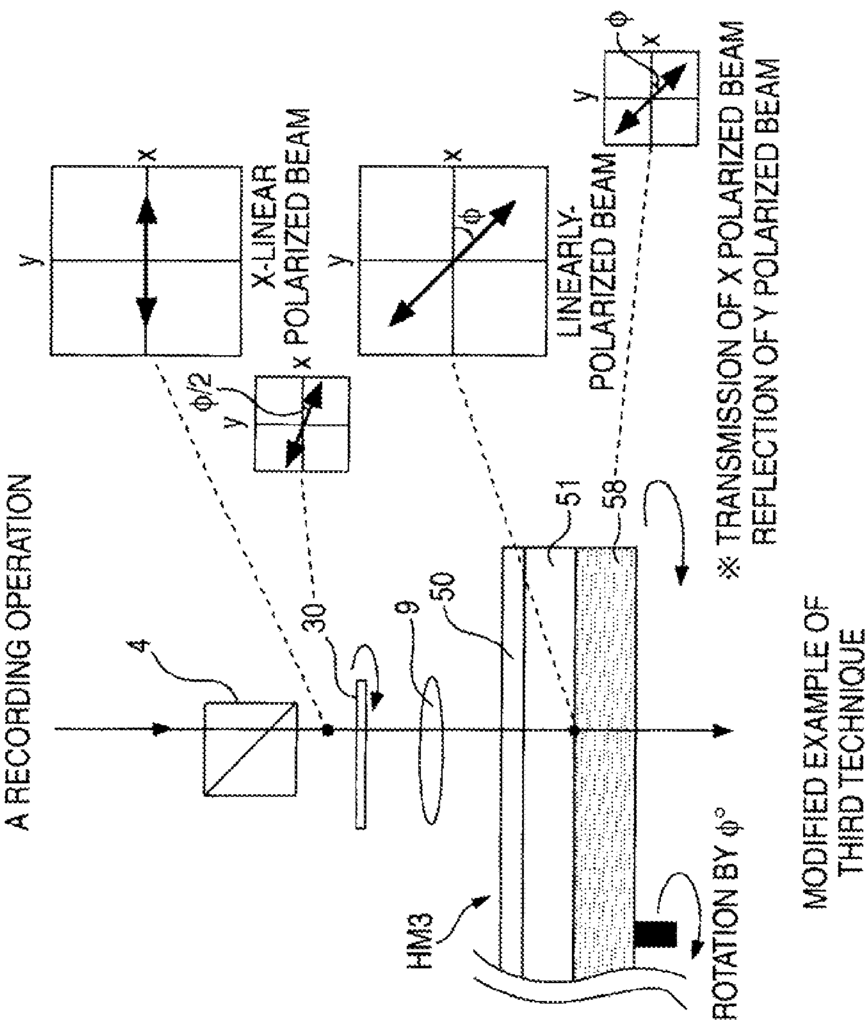
FIG. 18 is a diagram illustrating a modified example of the third technique, where data area recorded.
Figure 19:
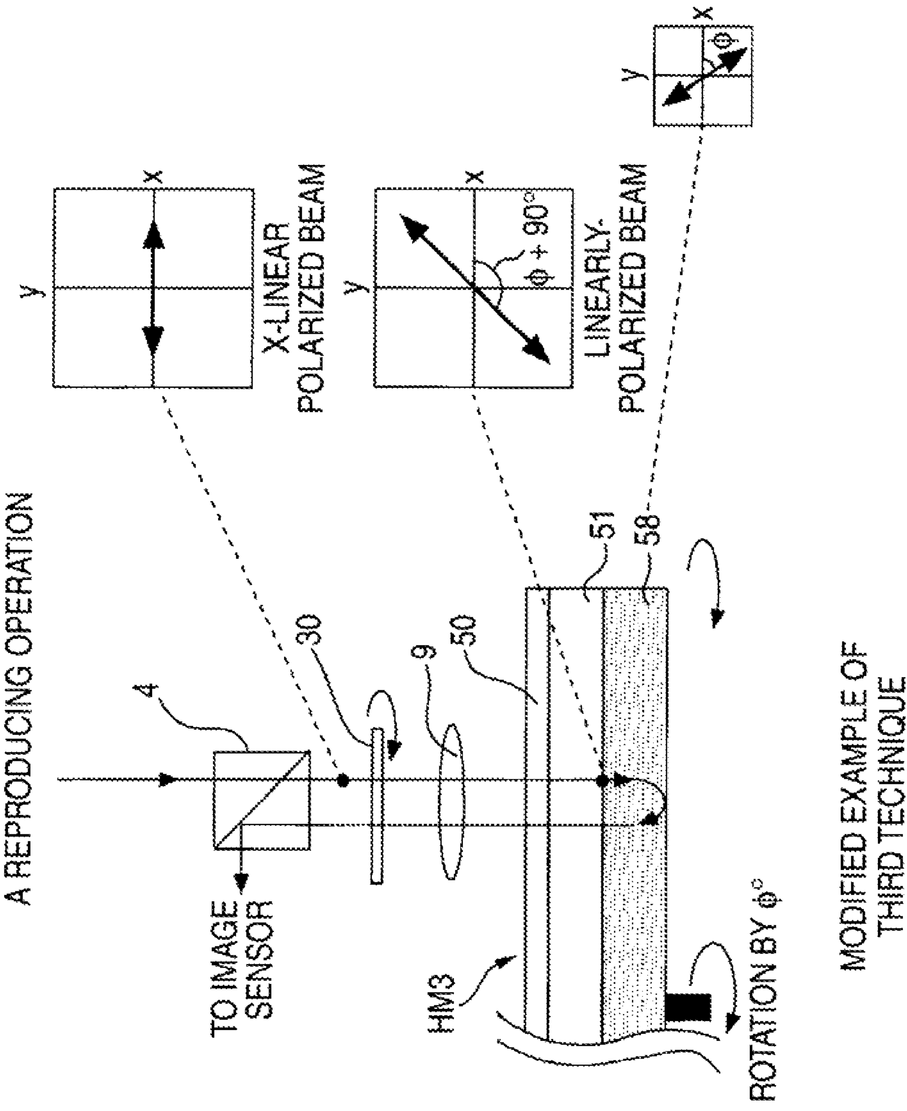
FIG. 19 is a diagram illustrating the modified example of the third technique, where data area reproduced.

FIGS. 18 and 19 are diagrams illustrating the modified example of the third technique, where FIG. 18 shows a recording operation and FIG. 19 shows a reproducing operation. In FIGS. 18 and 19, similarly to FIGS. 12 and 13, the hologram recording medium HM3 (sectional view), the beam splitter 4, the objective lens 9, and the half-wavelength plate 30, which are disposed in the apparatus, and the beam applied to the hologram recording medium HM3 through the beam splitter 4, the half-wavelength plate 30, and the objective lens 9 are schematically shown. In addition, the polarization directions of the beam incident on the half-wavelength plate 30 and the beam incident on the reflecting linear polarization element 58 in the hologram recoding medium HM3, the optical axis direction of the half-wavelength plate 30, and the polarization axis direction of the reflecting linear polarization element 58 are shown.

Since the modified example of the third technique is based on the third technique, the elements described in the third technique are denoted by like reference numerals and description thereof is omitted.

First, in the recording operation shown in FIG. 18 and the reproducing operation shown in FIG. 19, the hologram recording medium HM3 is rotated from the rotation angle of 0° (the medium rotation angle is 0°) to φ°. In this case, the state where the medium rotation angle is 0° is the state shown in FIGS. 12 and 13, that is, the state where the polarization axis direction of the reflecting linear polarization element 58 formed in the hologram recording medium HM3 is parallel to the polarization direction (that is, X axis direction in this case) of the beam incident on the half-wavelength plate 30 of the apparatus.

As can be understood from the description with reference to FIGS. 12 and 13, in the hologram recording medium HM3 of which the medium rotation angle is 0° and which is used in the third technique, the optical axis direction of the half-wavelength plate 30 is parallel to the polarization direction (X axis direction in this case) of the incident beam at the time of performing a recording operation and the optical axis of the half-wavelength plate 30 is inclined by 45° about that of the recording operation, whereby it is possible to prevent the backward beam from being generated in the recording operation and to properly obtain the reproduced beam in the reproducing operation. That is, the driving states of the half-wavelength plate 30 in the recording and reproducing operations are the same as the second technique.

Accordingly, in the modified example of the third technique, in order to cope with the rotation of the hologram recording medium HM, similarly to the modified example of the second technique, the half-wavelength plate 30 is rotationally driven so as to maintain the relation of "θ=φ/2" at the time of performing a recording operation shown in FIG. 18. At the time of performing a reproducing operation shown in FIG. 19, the half-wavelength plate 30 is rotationally driven so as to maintain the relation of "θ=45+φ/2".

In the modified example of the third technique, the half-wavelength plate 30 disposed in the apparatus is driven to rotate with the rotation of the hologram recording medium HM3 in the recording operation and the reproducing operation while the optical axis maintains the angle difference of 45° between the recording operation and the reproducing operation. Accordingly, even when the hologram recording medium HM3 is rotationally driven, the linearly-polarized beams of which polarization directions are perpendicular to each other are applied to the hologram recording medium HM3 in the recording operation and the reproducing operation, respectively. As a result, depending on the characteristics of the reflecting linear polarization element 58 formed in the hologram recording medium HM3, the beam applied to the medium can be transmitted by the reflecting linear polarization element 58 in the recording operation to output the applied beam through the entire medium and the applied beam can be reflected by the reflecting linear polarization element 58 in the reproducing operation, thereby obtaining the backward beam. Accordingly, even when the hologram recording medium HM3 is rotationally driven, it is possible to record only one kind of transmissive hologram without generating the backward beam in the recording operation and to properly obtain the reproduced beam in the reproducing operation.

In order to implement the modified example of the third technique, it is necessary to rotationally drive the half-wavelength plate 30 so as to follow the rotation of the hologram recording medium HM3. Accordingly, the rotation angle information is recorded on the hologram recording medium HM3.

The sectional structure of the hologram recording medium HM3 is the same as shown in FIG. 14. At least the rotation angle information is recorded on the pitted surface of the substrate 56.

In order to cope with the hologram recording medium HM3, the recording and reproducing apparatus for implementing the modified example of the third technique described with reference to FIGS. 18 and 19 can have the same configuration as described with reference to FIG. 17.

2-4. Fourth Technique

A fourth technique will be described now.

The fourth technique is to cope with the rotation of a medium, similarly to the modified example of the second technique and the modified example of the third technique.

Figure 20:
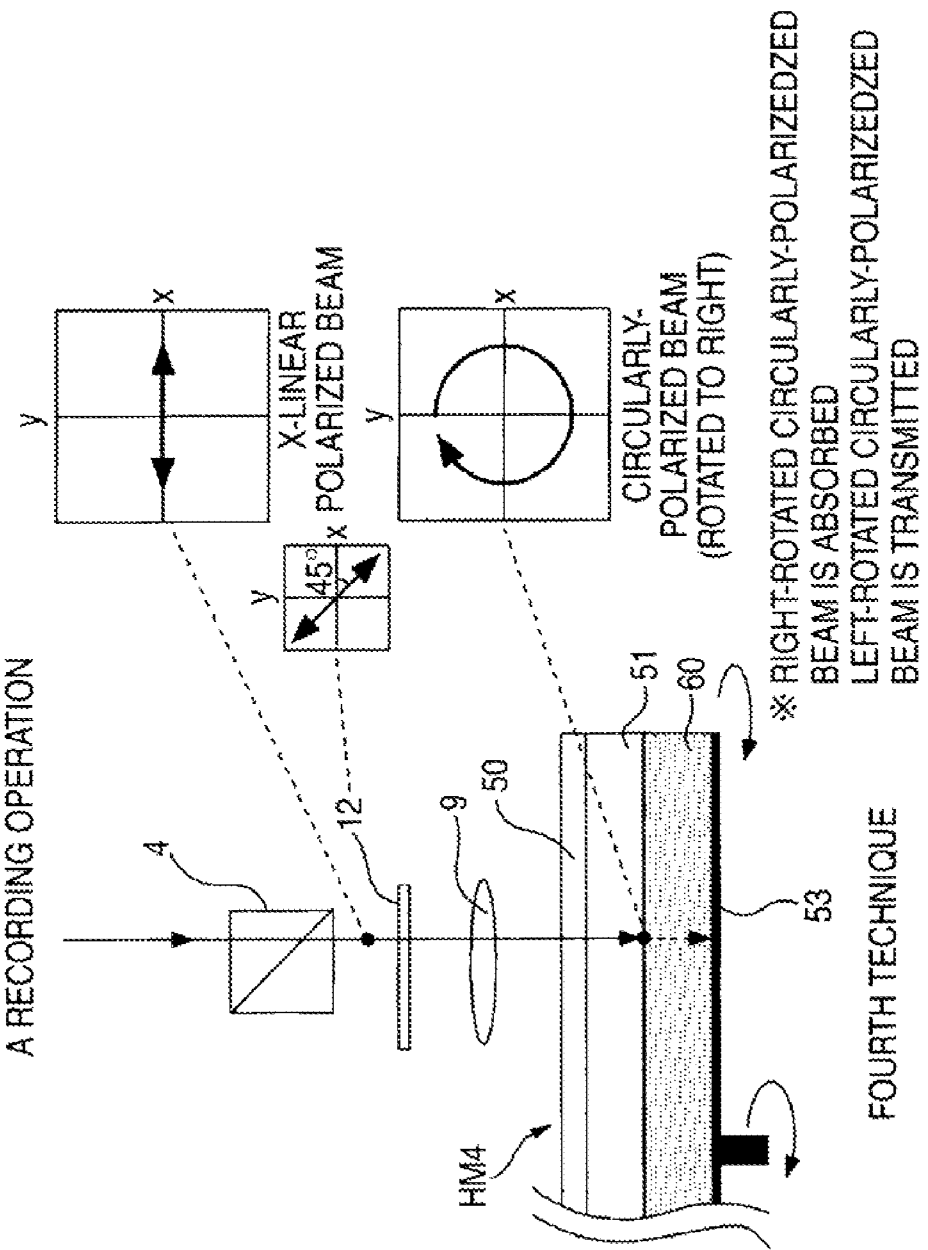
FIG. 20 is a diagram illustrating a fourth technique of the beam applying method according to the embodiment, where data are recorded.
Figure 21:
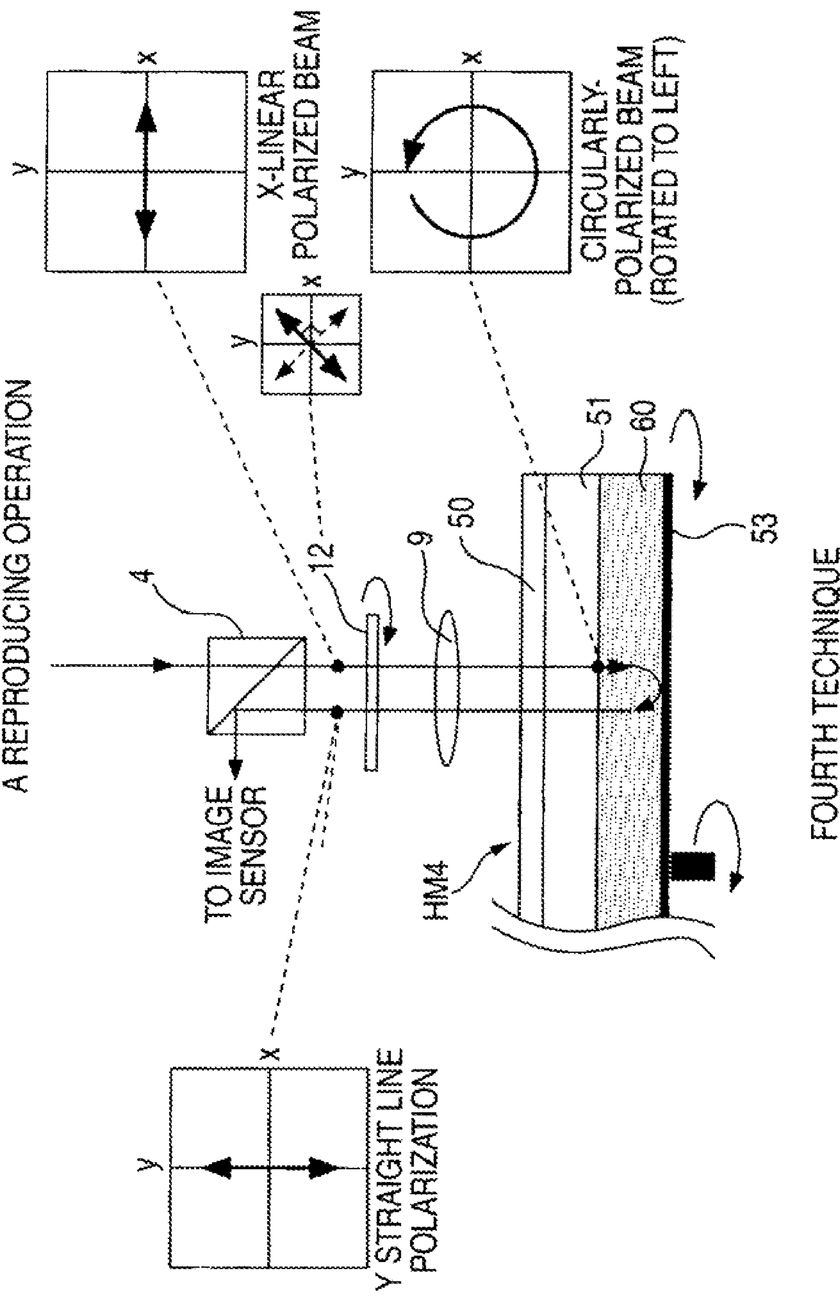
FIG. 21 is a diagram illustrating the fourth technique of the beam applying method according to the embodiment, where data are reproduced.

FIGS. 20 and 21 are diagrams illustrating a beam applying method as the fourth technique, where a hologram recording medium HM4 (sectional view) used in the fourth technique, the beam splitter 4, the objective lens 9, and the quarter-wavelength plate 12 which are disposed in the apparatus, and the beam applied to the hologram recording medium HM4 through the beam splitter 4, the quarter-wavelength plate 12, and the objective lens 9 are schematically shown. FIG. 20 shows a recording operation and FIG. 21 shows a reproducing operation.

In FIGS. 20 and 21, the polarization directions of the beam incident on the quarter-wavelength plate 12 and the beam incident on the polarization element (the absorbing circular polarization element 60 in the figure) formed in the hologram recording medium HM4 are also shown. In FIG. 21, the polarization direction of the reflected beam (backward beam) obtained from the hologram recording medium HM4 at the time of performing a reproducing operation is also shown.

In the fourth technique, the elements described above are denoted by like reference numerals and description thereof is omitted.

As shown in FIGS. 20 and 21, in the hologram recording medium HM4 used in the fourth technique, the cover glass 50, the recording layer 51, the absorbing circular polarization element 60, and the reflecting film 53 are sequentially formed from the uppermost.

The absorbing circular polarization element 60 means an absorbing polarization element having circular dichroism. That is, the absorbing circular polarization element has a characteristic of absorbing a circularly-polarized beam (for example, right-rotated circularly-polarized beam) having a predetermined rotation direction and transmitting the oppositely-rotated (left-rotated) circularly-polarized beam. An example of the absorbing polarization element having the circular dichroism as the absorbing circular polarization element 60 can include polymer materials such as cholesteric liquid crystal.

In the fourth technique, the directionally-rotated (right-rotated) circularly-polarized beam is applied to the hologram recording medium HM4 by the use of the circular dichroism of the absorbing circular polarization element 60. At the time of performing a reproducing operation, the oppositely-rotated (left-rotated) circularly-polarized beam is applied to the hologram recording medium HM4.

Accordingly, the beam applied to the medium is absorbed by the absorbing circular polarization element 60 in the recording operation so as not to obtain the reflected beam (backward beam) from the reflecting film 53. The applied beam is transmitted by the absorbing circular polarization element 60 in the reproducing operation so as to properly obtain the reflected beam (backward beam) from the reflecting film 53.

Therefore, in the fourth technique, the optical axis direction of the quarter-wavelength plate 12 disposed in the apparatus is set to form an angle of 45° about the polarization direction of the beam incident on the quarter-wavelength plate 8 in the recording operation shown in FIG. 20. Specifically, since the beam incident on the quarter-wavelength plate 12 is the X-linear polarized beam, the optical axis direction of the quarter-wavelength plate 12 is inclined by 45° about the X axis direction.

In the reproducing operation shown in FIG. 21, the quarter-wavelength plate 12 is rotationally driven so that the optical axis direction of the quarter-wavelength plate 12 is inclined by 90° about that of the recording operation.

In this way, the circularly-polarized beam of a predetermined rotation direction (rotation to right) can be applied to the hologram recording medium HM4 at the time of performing a recording operation as described above. At the time of performing a reproducing operation, the circularly-polarized beam of the opposite rotation direction (rotation to left) can be applied thereto.

Since the absorbing circular polarization element 60 has the circular dichroism, the above-mentioned characteristic is obtained regardless of the rotation of the hologram recording medium HM4. Accordingly, when the circularly-polarized beam of a predetermined rotation direction can be applied in the recording operation and the hologram recording medium HM4 is rotationally driven, the applied beam can be absorbed by the absorbing circular polarization element 60 so as not to generate the backward beam. Similarly, when the circularly-polarized beam of the opposite rotation direction can be applied to the hologram recording medium HM4 and the hologram recording medium HM4 is rotationally driven, the applied beam can be transmitted by the absorbing circular polarization element 60 so as to properly obtain the reproduced beam in the reproducing operation.

According to the fourth technique, when the hologram recording medium HM is rotationally driven, it is possible to record only one kind of transmissive hologram in the recording operation and to obtain the reproduced beam in the reproducing operation.

According to the fourth technique, like the above-mentioned modified examples, it is not necessary to rotationally drive the wavelength plate of the apparatus so as to follow the rotation of the medium. In this case, the apparatus can include the configuration for driving the wavelength plate so as to give a predetermined angle difference between the recording operation and the reproducing operation, similarly to the first to third techniques, and may not include the configuration for reading the rotation angle information like the modified examples and the configuration for controlling the rotation angle of the wavelength plate on the basis of the rotation angle information. Accordingly, according to the fourth technique, the configuration for coping with the rotation of the medium can be made very simpler than the above-mentioned modified examples.

As can be understood from the above description, according to the fourth technique, it is not necessary to record the rotation angle information on the hologram recording medium HM4.

According to the fourth technique, as shown in FIG. 21, the polarization direction of the beam after the backward beam obtained in the reproducing operation passes through the quarter-wavelength plate 12 of the apparatus can be made to be perpendicular to the polarization direction of the forward beam. That is, in the example shown in FIG. 21, the forward beam is the X-linear polarized beam and the backward beam is the Y-linear polarized beam.

Since the polarization direction of the backward beam can be made to be perpendicular to the polarization direction of the forward beam, a polarizing beam splitter can be used as the beam splitter 4 of the apparatus. When the polarization direction of the forward beam (for example, X axis direction) can be made to be perpendicular to the polarization direction of the backward beam (for example, Y axis direction), the beam splitter 4 can be embodied by the polarizing beam splitter configured to transmit the X-linear polarized beam and to reflect the Y-linear polarized beam.

The hologram recording medium HM4 in which the recording layer 51, the absorbing circular polarization element 60, and the reflecting film 53 are sequentially formed from the uppermost is used in the fourth technique. In the hologram recording medium HM4, since a circularly-polarized beam of a predetermined rotation direction (for example, right-rotated circularly-polarized beam) is applied to the hologram recording medium HM4 at the time of performing a recording operation and the circularly-polarized beam of the opposite rotation direction (for example, left-rotated circularly-polarized beam) is applied thereto at the time of performing a reproducing operation, it is possible to record only one kind of transmissive hologram at the time of performing a recording operation and to properly obtain the reproduced beam at the time of performing a reproducing operation.

Accordingly, according to the hologram recording medium HM4, it is possible to provide an optical recording medium that can allow only one kind of transmissive hologram to be recorded at the time of performing a recording operation and that can allow a reproduced beam to be obtained at the time of performing a reproducing operation, so as to correspond to the recording and reproducing apparatus having the above-mentioned configuration.

As described above, according to the fourth technique, it is not necessary to record the rotation angle information on the hologram recording medium HM4. However, when the hologram recording medium HM4 is rotationally driven, it is necessary to allow the apparatus to perform a variety of server control. Accordingly, in the hologram recording medium HM4, it is necessary to form the pitted surface (including a guide groove) on the substrate 56.

In FIGS. 20 and 21, for the purpose of convenient explanation, the structure of the hologram recording medium HM4 is schematically shown simply. However, in the actual configuration of the hologram recording medium HM4, the absorbing linear polarization element 57 in the hologram recording medium HM2 shown in FIG. 11 is replaced with the absorbing circular polarization element 60.

However, according to the fourth technique shown in FIG. 20, since the applied beam is absorbed by the absorbing circular polarization element 60 at the time of performing a recording operation, the laser beam of which the light source is the second laser 15 cannot reach the reflecting film 55 on the pitted surface, thereby not allowing the apparatus to perform the servo control. Accordingly, the absorbing circular polarization element 60 should have the wavelength selectivity.

In order to allow the laser beam of which the light source is the second laser 15 to reach the reflecting film 55 at the time of performing a recording operation, the method of giving the wavelength selectivity to the quarter-wavelength plate 12 of the apparatus may be employed.

Figure 22:
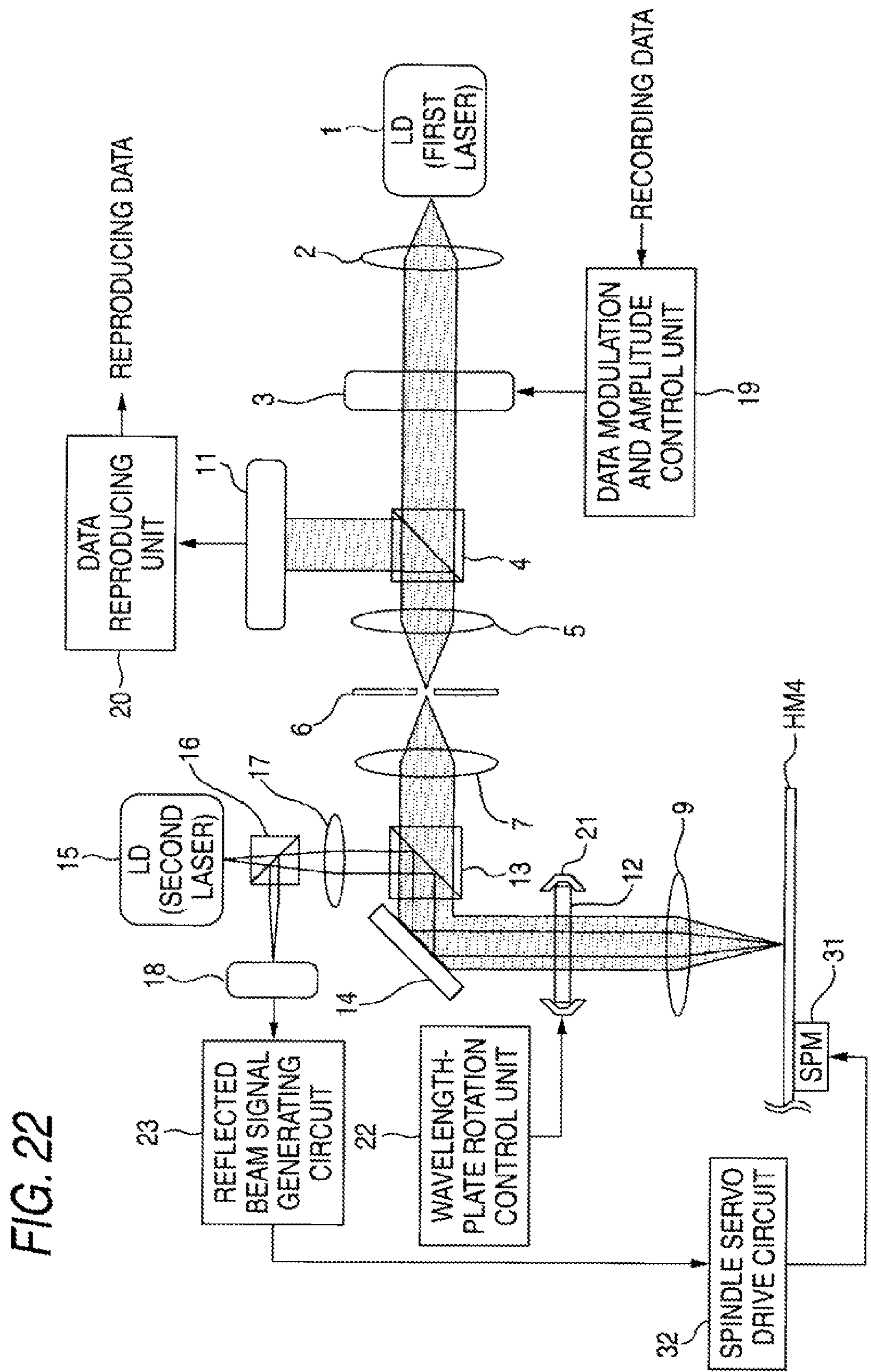
FIG. 22 is a diagram illustrating an internal configuration of a recording and reproducing apparatus for implementing the fourth technique (and a fifth technique).

For example, a configuration of the recording and reproducing apparatus for implementing the fourth technique to cope with the hologram recording medium HM4 is shown in FIG. 22.

In FIG. 22, the elements described above are denoted by like reference numerals and description thereof is omitted.

In the recording and reproducing apparatus shown in FIG. 22, the rotation angle information detecting unit 34 is omitted from the recording and reproducing apparatus shown in FIG. 17 and a rotational driving system including the wavelength plate rotation control unit 22, the rotational driving unit 21, and the quarter-wavelength plate 12 in the first technique described with reference to FIG. 7 is provided instead of the rotational driving system including the wavelength plate rotation control unit 33, the rotational driving unit 21, and the half-wavelength plate 30 described with reference to FIG. 17. That is, the rotational driving system is configured to drive the quarter-wavelength plate 12 so as to give the angle difference of 90° in the optical axis direction between the recording operation and the reproducing operation.

According to the recording and reproducing apparatus shown in FIG. 22, it is possible to embody the operations of the apparatus in the fourth technique described with reference to FIGS. 20 and 21. That is, it is possible to provide a recording and reproducing apparatus for implementing the fourth technique.

2-7. Fifth Technique

In a fifth technique, a polarization element having circular dichroism is used as the polarization element used in the hologram recording medium HM, similarly to the fourth technique, but the polarization element is not of an absorbing type, but of a reflecting type used in the third technique.

Figure 23:
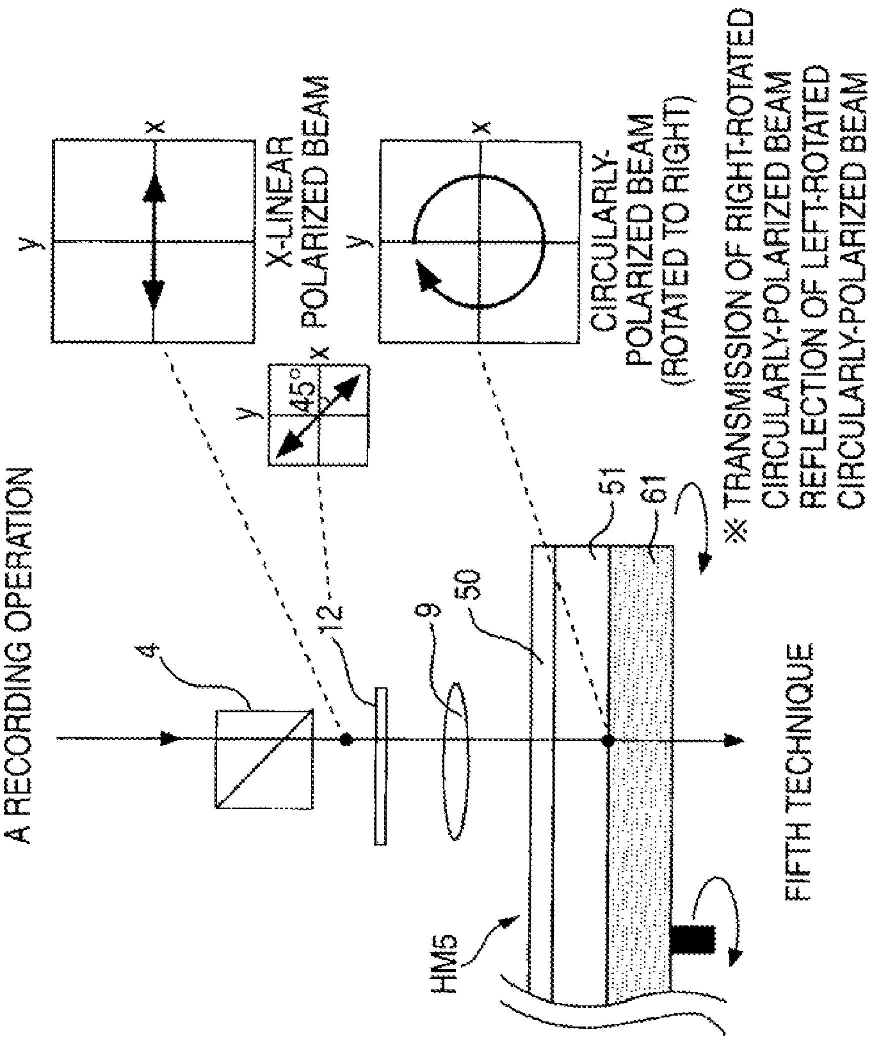
FIG. 23 is a diagram illustrating a fifth technique of the beam applying method according to the embodiment, where data are recorded.
Figure 24:
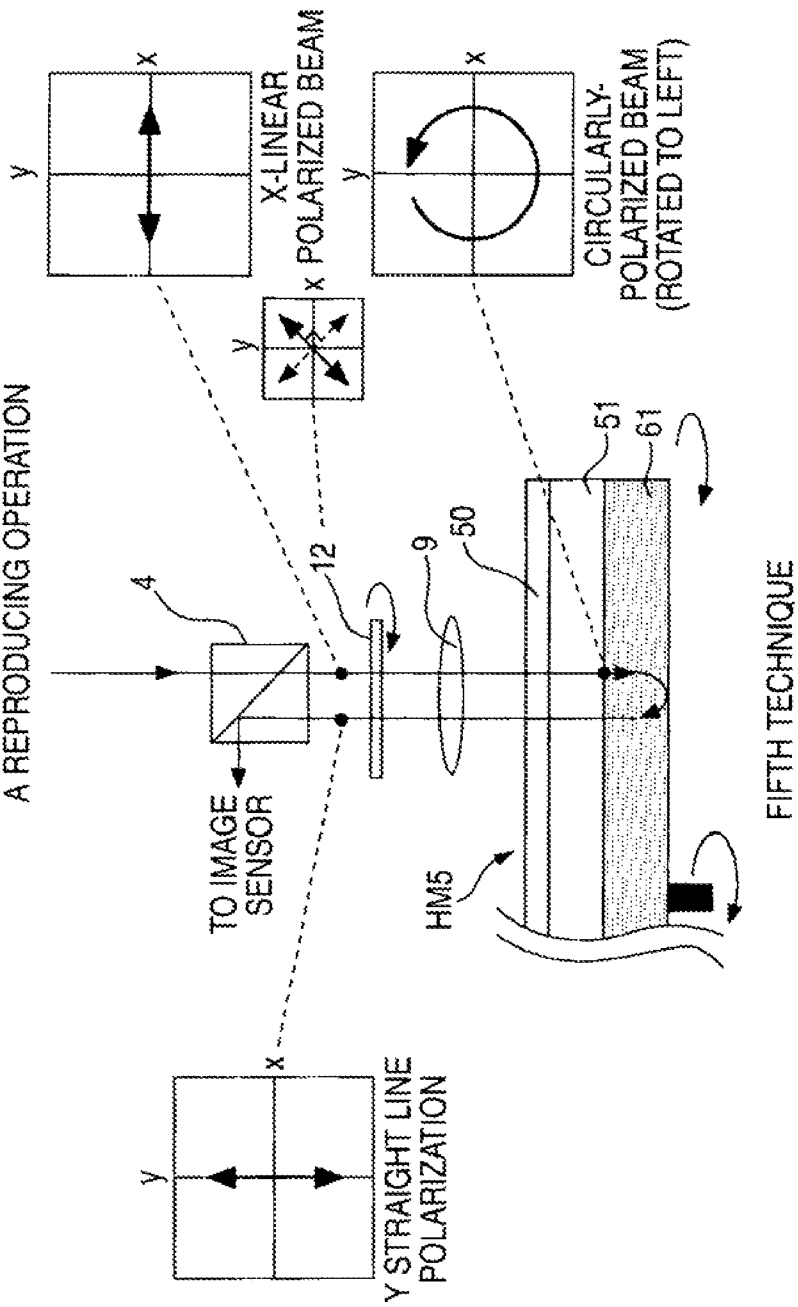
FIG. 24 is a diagram illustrating the fifth technique of the beam applying method according to the embodiment, where data are reproduced.
Figure 25A:
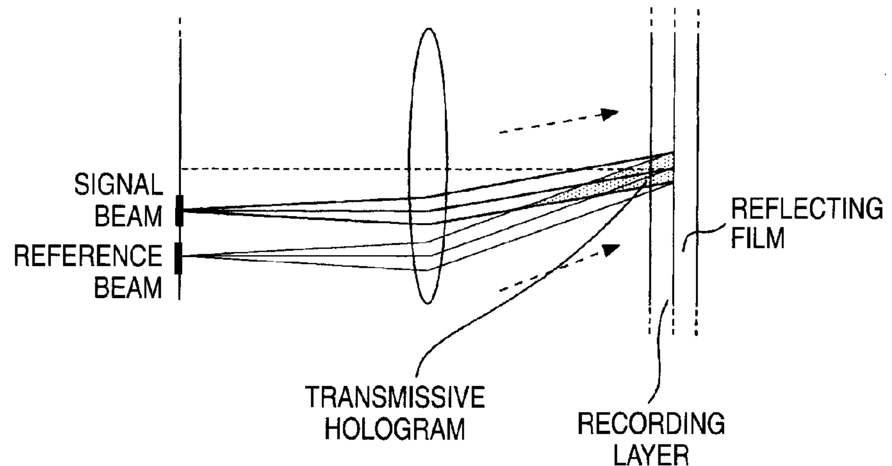
FIGS. 25A and 25B are diagrams illustrating patterns of holograms that can be generated at the time of recording data on a reflecting hologram recording medium.
Figure 25B:
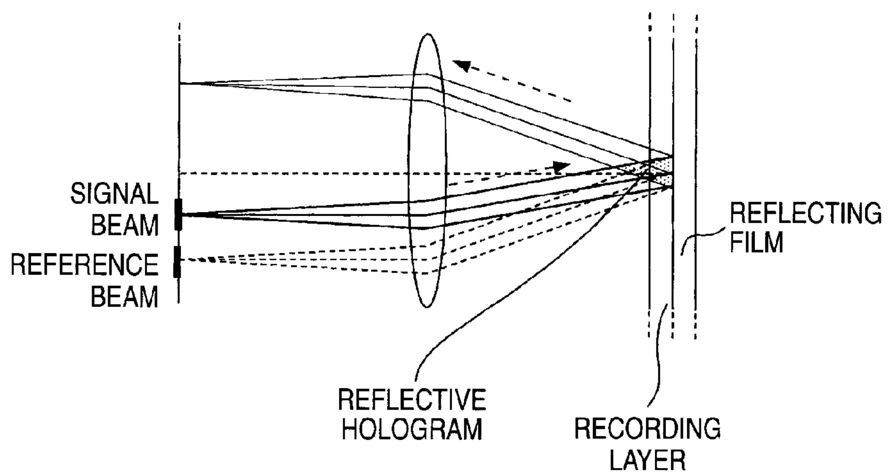

FIGS. 23 and 24 are diagrams illustrating the fifth technique, where a hologram recording medium HM5 (sectional view) used in the fifth technique, the beam splitter 4, the objective lens 9, and the quarter-wavelength plate 12 which are disposed in the apparatus, and the beam applied to the hologram recording medium HM5 through the beam splitter 4, the quarter-wavelength plate 12, and the objective lens 9 are schematically shown. FIG. 23 shows a recording operation and FIG. 24 shows a reproducing operation.

In FIGS. 23 and 24, the polarization directions of the beam incident on the quarter-wavelength plate 12 and the beam incident on the polarization element (reflecting circular polarization element 61) disposed in the hologram recording medium HM5 are shown. particularly, in FIG. 24, the polarization direction of the reflected beam obtained from the hologram recording medium HM5 at the time of performing a reproducing operation is also shown.

As shown in the figures, in the hologram recording medium HM5 used in the fifth technique, the reflecting circular polarization element 61 is formed instead of the absorbing circular polarization element 60 of the hologram recording medium HM4. In this case, similarly to the third technique, the reflecting film 53 is omitted because the polarization element is of a reflecting type.

Here, the reflecting circular polarization element 61 is a reflecting circular polarization element having circular dichroism and has a characteristic of transmitting a circularly-polarized beam of a predetermined rotation direction (for example, right-rotated circularly-polarized beam) and reflecting a circularly-polarized beam of the opposite rotation direction (left-rotated). The reflecting circular polarization element 61 can be formed of polymer materials such as cholesteric liquid crystal.

In the fifth technique, similarly to the fourth technique, the circularly-polarized beam of a predetermined rotation direction (rotation to right) is applied to the hologram recording medium HM5 using the characteristics of the reflecting circular polarization element 61 having the circular dichroism, so that the optical axis direction of the quarter-wavelength 12 of the apparatus is inclined about 45° about the polarization direction of the incident beam at the time of performing a recording operation as shown in FIG. 23. Accordingly, the incident beam can be transmitted by the reflecting circular polarization element 61 and the beam incident on the medium can pass through the entire medium and can be output so as not to generate the backward beam, similarly to the third technique.

At the time of performing a reproducing operation, as shown in FIG. 24, by driving the quarter-wavelength plate 12 so that the optical axis direction of the quarter-wavelength plate 12 is inclined by 90° from the state of the recording operation, the circularly-polarized beam of the opposite rotation direction opposite to the predetermined rotation direction is applied to the hologram recording medium HM5. Accordingly, the beam applied to the medium can be reflected by the reflecting circular polarization element 61 and the reproduced beam can be obtained in the reproducing operation.

Since the reflecting circular polarization element 61 has the circular dichroism, as described above, by applying the circularly-polarized beam of the predetermined rotation direction in the recording operation and applying the circularly-polarized beam of the opposite rotation direction in the reproducing operation, it is possible to prevent the backward beam from being generated in the recording operation and to obtain the backward beam in the reproducing operation, regardless of the rotation of the hologram recording medium HM5.

According to the fifth technique, when the hologram recording medium HM is rotationally driven, it is possible to record only one kind of transmissive hologram in the recording operation and to properly obtain the reproduced beam in the reproducing operation.

According to the fifth technique, since the medium employs the polarization element having the circular dichroism, the apparatus need not rotationally drive the wavelength plate so as to follow the rotation of the medium. In this case, the apparatus configuration for coping with the rotation of the medium can be made to be much simpler than those of the above-mentioned modified examples.

According to the fifth technique, it is not necessary to record the rotation angle information on the hologram recording medium HM5.

According to the fifth technique, as shown in FIG. 24, the polarization direction of the backward beam obtained in the reproducing operation can be made to be perpendicular to the polarization direction of the forward beam. Accordingly, the polarizing beam splitter can be used as the beam splitter 4 of the apparatus.

The hologram recording medium HM5 in which the recording layer 51 and the reflecting circular polarization element 61 are sequentially formed from the uppermost is used in the fifth technique. In the hologram recording medium HM5, since a circularly-polarized beam of a predetermined rotation direction (for example, right-rotated circularly-polarized beam) is applied to the hologram recording medium HM5 at the time of performing a recording operation and the circularly-polarized beam of the opposite rotation direction (for example, left-rotated circularly-polarized beam) is applied thereto at the time of performing a reproducing operation, it is possible to record only one kind of transmissive hologram at the time of performing a recording operation and to properly obtain the reproduced beam at the time of performing a reproducing operation. Accordingly, according to the hologram recording medium HM5, it is possible to provide an optical recording medium that can allow only one kind of transmissive hologram to be recorded at the time of performing a recording operation and that can allow a reproduced beam to be obtained at the time of performing a reproducing operation, so as to correspond to the recording and reproducing apparatus having the above-mentioned configuration.

The recording and reproducing apparatus for implementing the fifth technique can have the same configuration as described with reference to FIG. 22 in the fourth technique.

In the fifth technique, in order to perform a variety of servo control, it is necessary to form the pitted surface in the hologram recording medium HM. Specifically, in the configuration of the hologram recording medium HM3 used in the third technique shown in FIG. 14, the reflecting circular polarization element 61 can be formed instead of the reflecting linear polarization element 58. That is, the reflecting film 59 having the wavelength selectivity should be formed to prevent the beam passing through the reflecting polarization element from being reflected by the reflecting film of the recording layer (pitted surface). In order that the beam of which the light source is the second laser 15 should not be reflected by the reflecting circular polarization element 61 at the time of performing a reproducing operation, the reflecting circular polarization element 61 should have the wavelength selectivity.

In order that the laser beam of which the light source is the second laser 15 should not be reflected by the reflecting circular polarization element 61 at the time of performing a reproducing operation, the wavelength selectivity may be given to the quarter-wavelength plate 12 of the apparatus side.

MODIFIED EXAMPLE

Although the embodiment has been described, the application is not limited to the above-mentioned specific examples.

For example, although it has been described in the modified example of the second technique and the modified example of the third technique that the rotation angle information recorded in the hologram recording medium HM is read in rotationally driving the half-wavelength plate 30 with the rotation of the medium, the rotation angle information may be obtained on the basis of the detection result of the rotation angle of the spindle motor 31.

However, when the technique obtaining the rotation angle information from the rotation angle of the spindle motor 31 is employed, it is necessary to consider the attachment angle of the hologram recording medium HM to the apparatus.

In the description of the modified examples of the second and third techniques, when the medium rotation angle is 0° as a reference state, it is assumed that the polarization axis direction of the polarization element (the absorbing linear polarization element 57 and the reflecting linear polarization element 58) in the hologram recording medium HM is parallel to the optical axis direction of the half-wavelength plate 30 in the apparatus.

For example, when the rotation angle information is recorded in the hologram recording medium HM, it means that the medium rotation angle is displayed by the rotation angle information at a view. Accordingly, as described above, using the direction of the rotation angle of 0° defined by the recording of the rotation angle information as a reference, it is assumed that the polarization axis direction of the polarization element is set to be parallel thereto, the optical axis direction of the half-wavelength plate 30 is parallel to the polarization direction of the incident beam in the state where the rotation angle of the half-wavelength plate 30 is 0°. Then, even when the medium is attached at any angle, the modified examples of the second and third techniques can be established by performing the rotation control corresponding to "$\theta=\phi/2$" or "$\theta=45+\phi/2$".

However, when the rotation angle information is not read from the medium such as when the rotation angle of the spindle motor 25 is used, the medium rotation angle cannot be determined at a view by the apparatus and the hologram recording medium HM is not attached to acquire the above-mentioned reference state. In this case, the techniques cannot be established.

Therefore, when the technique of detecting the rotation angle of the spindle motor 31 is employed, an attachment position determining member setting the attachment angle of the hologram recording medium HM to the apparatus to an angle at which the reference state of the techniques are obtained and the like are provided. Accordingly, even when the technique of detecting the rotation angle of the spindle motor 31 is employed, the modified examples of the second and third techniques can be properly established by only performing the rotation control of "$\theta=\phi/2$" or "$\theta=45+\phi/2$."

Although it has been described that the wavelength of the first laser 1 used to record and reproduce a hologram is 410 nm and the wavelength of the second laser 15 used to read the information for a variety of servo control is 650 nm, the numerical values are only examples and may be properly changed in the actual configuration.

The configuration of the optical system of the beam applying apparatus described above is only an example and the present application is not limited to the configuration.

For example, although the transmissive SLM 3 has been used as the SLM 3 modulating the light intensity, the reflecting light intensity modulator such as a reflecting liquid crystal panel or a DMD (Digital Micro mirror Device) may be used.

The hologram recording medium HM is not limited to the above-mentioned configurations, but may have different configurations such as a configuration in which a polarization element is adhered to the recording layer 51 with an adhesive material and an intermediate layer is interposed between the recording layer 51 and the polarization element as a result. That is, in the optical recording medium according to the embodiment, when the polarization element (the set of a quarter-wavelength plate and a polarizing plate in the first technique) is formed below the recording layer on which a signal is recorded and the polarization element is one of the set of a quarter-wavelength plate and a polarizing plate, the absorbing linear polarization element, and the absorbing circular polarization element, a reflecting film can be formed below the polarization element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beam applying method of performing recording and reproducing operations on an optical recording medium, in which a signal is recorded and reproduced by applying a beam thereto and which has a recording layer on which the signal is recorded, a first quarter-wavelength plate formed below the recording layer, a polarizing plate formed below the first quarter-wavelength plate, and a reflecting film formed below the polarizing plate, the beam applying method comprising:

emitting a beam to be applied to the optical recording medium, the beam applied through the first quarter-wavelength plate, the recording layer, the polarizing plate, and then on the reflecting film; and driving a second quarter-wavelength plate inserted into an optical system serving to guide the emitted beam to the optical recording medium so that the optical axis direction thereof has a predetermined angle difference at the time of performing a recording operation and reproduction, wherein the polarizing plate is configured such that during the recording operations a first linearly-polarized beam is absorbed by the polarizing plate such that the beam does not reach the reflecting film, and during the reproducing operations a second linearly-polarized beam oriented perpendicular to the first linearly-polarized beam is transmitted to the reflecting film.

2. An optical recording medium in which a signal is recorded and reproduced by applying a beam thereto, the optical recording medium comprising:

a recording layer on which a signal is recorded;

a quarter-wavelength plate formed below the recording layer;

a polarizing plate formed below the quarter-wavelength plate; and a reflecting film formed below the polarizing plate, wherein the polarizing plate is configured such that during recording operations a first linearly-polarized beam exiting the quarter-wavelength plate is absorbed by the polarizing plate and does not reach the reflecting film, and during reproducing operations a second linearly-polarized beam oriented perpendicular to the first linearly-polarized beam and exiting the quarter-wavelength plate is transmitted to the reflecting film.

* * * * *